US009202455B2

(12) United States Patent
Park et al.

(10) Patent No.: US 9,202,455 B2

(45) Date of Patent: Dec. 1, 2015

(54) SYSTEMS, METHODS, APPARATUS, AND COMPUTER PROGRAM PRODUCTS FOR ENHANCED ACTIVE NOISE CANCELLATION

(75) Inventors: Hyun Jin Park, San Diego, CA (US); Kwokleung Chan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1779 days.

(21) Appl. No.: 12/621,107

(22) Filed: Nov. 18, 2009

(65) Prior Publication Data

US 2010/0131269 A1 May 27, 2010

Related U.S. Application Data

(60) Provisional application No. 61/117,445, filed on Nov. 24, 2008.

(51) Int. Cl.
*H04B 15/00* (2006.01)
*G10K 11/178* (2006.01)

(52) U.S. Cl.
CPC ...... *G10K 11/178* (2013.01); *G10K 2210/1081* (2013.01)

(58) Field of Classification Search
CPC .......... G10K 11/1784; G10K 11/1788; G10K 2210/108; G10K 2210/1081; G10K 2210/3026; G10K 2210/3027; G10K 2210/3028; G10K 2210/512
USPC ......... 381/71, 83, 93, 94, 71.8, 96, 163, 71.7, 381/92, 95, 94.1–94.7, 71.4–71.6; 704/227
See application file for complete search history.

(56) References Cited

U.S. PATENT DOCUMENTS

| | | | |
|---|---|---|---|
| 4,630,304 | A | 12/1986 | Borth et al. |
| 5,105,377 | A | 4/1992 | Ziegler |
| 5,381,473 | A | 1/1995 | Andrea et al. |
| 5,533,119 | A | 7/1996 | Adair et al. |
| 5,640,450 | A | 6/1997 | Watanabe |

(Continued)

FOREIGN PATENT DOCUMENTS

| | | | |
|---|---|---|---|
| CN | 1152830 | A | 6/1997 |
| EP | 0643881 | B1 | 12/1998 |

(Continued)

OTHER PUBLICATIONS de Diego, M. et al. An adaptive algorithms comparison for real multichannel active noise control. EUSIPCO (European Signal Processing Conference) 2004, Sep. 6-10, 2004, Vienna, AT, vol. II, pp. 925-928.

(Continued)

*Primary Examiner* — Fan Tsang
*Assistant Examiner* — Eugene Zhao
(74) *Attorney, Agent, or Firm* — Espartaco Diaz Hidalgo

(57) ABSTRACT

Uses of an enhanced sidetone signal in an active noise cancellation operation are disclosed. In one example, a method of audio signal processing includes producing an anti-noise signal based on information from a first audio signal. A target component of a second audio signal is separated from a noise component of the second audio signal to produce at least one among a separated target component and a separated noise component. Based on at least one among the separated target component and the separated noise component, an audio output signal is produced.

54 Claims, 30 Drawing Sheets

(56) References Cited

U.S. PATENT DOCUMENTS

| | | | | |
|---|---|---|---|---|
| 5,732,143 | A | 3/1998 | Andrea et al. | |
| 5,815,582 | A * | 9/1998 | Claybaugh et al. | 381/71.6 |
| 5,828,760 | A | 10/1998 | Jacobson et al. | |
| 5,862,234 | A * | 1/1999 | Todter et al. | 381/71.6 |
| 5,918,185 | A | 6/1999 | Knoedl, Jr. | |
| 5,937,070 | A | 8/1999 | Todter et al. | |
| 5,946,391 | A | 8/1999 | Dragwidge et al. | |
| 5,999,828 | A | 12/1999 | Sih et al. | |
| 6,041,126 | A | 3/2000 | Terai et al. | |
| 6,108,415 | A | 8/2000 | Andrea | |
| 6,151,391 | A | 11/2000 | Sherwood et al. | |
| 6,385,323 | B1 | 5/2002 | Zoels | |
| 6,549,630 | B1 | 4/2003 | Bobisuthi | |
| 6,768,795 | B2 | 7/2004 | Feltstrom et al. | |
| 6,850,617 | B1 | 2/2005 | Weigand | |
| 6,934,383 | B2 | 8/2005 | Kim | |
| 6,993,125 | B2 | 1/2006 | Michaelis | |
| 7,065,219 | B1 | 6/2006 | Abe et al. | |
| 7,142,894 | B2 | 11/2006 | Ichikawa et al. | |
| 7,149,305 | B2 | 12/2006 | Houghton | |
| 7,315,623 | B2 | 1/2008 | Gierl et al. | |
| 7,330,739 | B2 | 2/2008 | Somayajula | |
| 7,464,029 | B2 | 12/2008 | Visser et al. | |
| 7,561,700 | B1 | 7/2009 | Bernardi et al. | |
| 7,953,233 | B2 | 5/2011 | Holloway et al. | |
| 8,229,740 | B2 * | 7/2012 | Nordholm | G10K 11/1786 381/313 |
| 8,428,661 | B2 * | 4/2013 | Chen | 455/570 |
| 2002/0061103 | A1 | 5/2002 | Pehrsson | |
| 2002/0114472 | A1 | 8/2002 | Lee et al. | |
| 2003/0179888 | A1 | 9/2003 | Burnett et al. | |
| 2003/0198357 | A1 * | 10/2003 | Schneider et al. | 381/94.2 |
| 2003/0228013 | A1 | 12/2003 | Etter | |
| 2004/0001602 | A1 | 1/2004 | Moo et al. | |
| 2004/0071207 | A1 * | 4/2004 | Skidmore et al. | 375/233 |
| 2004/0168565 | A1 | 9/2004 | Nagao et al. | |
| 2005/0249355 | A1 * | 11/2005 | Chen et al. | 381/71.14 |
| 2005/0276421 | A1 | 12/2005 | Bergeron et al. | |
| 2005/0281415 | A1 * | 12/2005 | Lambert et al. | 381/92 |
| 2006/0069556 | A1 | 3/2006 | Nadjar | |
| 2006/0262938 | A1 | 11/2006 | Gauger | |
| 2007/0238490 | A1 | 10/2007 | Myrberg et al. | |
| 2008/0004872 | A1 * | 1/2008 | Nordholm et al. | 704/226 |
| 2008/0019548 | A1 * | 1/2008 | Avendano | 381/313 |
| 2008/0130929 | A1 | 6/2008 | Arndt | |
| 2008/0152167 | A1 | 6/2008 | Taenzer | |
| 2008/0162120 | A1 | 7/2008 | MacTavish et al. | |
| 2008/0201138 | A1 * | 8/2008 | Visser et al. | 704/227 |
| 2008/0269926 | A1 * | 10/2008 | Xiang et al. | 700/94 |
| 2009/0034748 | A1 | 2/2009 | Sibbald | |
| 2009/0074199 | A1 * | 3/2009 | Kierstein et al. | 381/71.6 |
| 2009/0111507 | A1 * | 4/2009 | Chen | 455/550.1 |
| 2009/0170550 | A1 | 7/2009 | Foley | |
| 2010/0022280 | A1 | 1/2010 | Schrage | |
| 2010/0081487 | A1 | 4/2010 | Chen et al. | |
| 2010/0150367 | A1 | 6/2010 | Mizuno | |

FOREIGN PATENT DOCUMENTS

| | | | |
|---|---|---|---|
| EP | 1102459 | A2 | 5/2001 |
| EP | 1124218 | A1 | 8/2001 |
| JP | 3042918 | | 2/1991 |
| JP | 8023373 | A | 1/1996 |
| JP | 9037380 | A | 2/1997 |
| JP | 10268873 | A | 10/1998 |
| JP | 11187112 | A | 7/1999 |
| JP | 2000059876 | A | 2/2000 |
| JP | 2002164997 | A | 6/2002 |
| JP | 2002189476 | A | 7/2002 |
| JP | 2003078987 | A | 3/2003 |
| JP | 2006014307 | A | 1/2006 |
| TW | 399392 | B | 7/2000 |
| WO | 9725790 | | 7/1997 |
| WO | 2007046435 | A1 | 4/2007 |
| WO | 2008058327 | | 5/2008 |

OTHER PUBLICATIONS

Bartels V: "Headset With Active Noise-Reduction System for Mobile Applications", Journal of the Audio Engineering Society, Audio Engineering Society, New York, NY, US, vol. 40, No. 4, Apr. 1, 1992, pp. 277-281, XP000278536, ISSN: 1549-4950.

International Search Report and Written Opinion—PCT/US2009/065696—International Search Authority, European Patent Office,Jan. 18, 2011.

Indexing Terms: Telephoning, Voice Communication, "Sidetone Expansion for the Regulation of Talker Loudness", electronics letters, Aug. 2, 1979, pp. 492-493, vol. 15, No. 16.

Introduction to Telephony, PacNOG5 VoIP Workshop, Papeete, French Polynesia, Jun. 2009, pp. 1-44.

ITU-T Recommendation P.76, "Determination of Loudness Ratings; Fundamental Principles", Telephone Transmission Quality Measurements Related to Speech Loudness, 1988, pp. 1-13, vol. V—Rec. P.76.

ITU-T Recommendation P.78, "Subjective Testing Method for Determination of Loudness Ratings in Accordance With Recommendation P.76", Telephone Transmission Quality Measurements Related to Speech Loudness, Feb. 1996, pp. 1-21.

Pro Series User Manual for the PS230 Dual Channel Speaker Station, User Manual PS 230 / Issue 1 © 1994 ASL Intercom, Utrecht, Holland, pp. 1-9.

SmartAudio 350, Innovative Sound and Voice Enhancement Technology, Technical brief, Broadcom, 2008, pp. 1-4.

* cited by examiner

SYSTEMS, METHODS, APPARATUS, AND COMPUTER PROGRAM PRODUCTS FOR ENHANCED ACTIVE NOISE CANCELLATION

CLAIM OF PRIORITY UNDER 35 U.S.C. §119

The present Application for Patent claims priority to Provisional Application No. 61/117,445, entitled "SYSTEMS, METHODS, APPARATUS, AND COMPUTER PROGRAM PRODUCTS FOR ENHANCED ACTIVE NOISE CANCELLATION," filed Nov. 24, 2008, and assigned to the assignee hereof.

BACKGROUND

1. Field

This disclosure relates to audio signal processing.

2. Background

Active noise cancellation (ANC, also called active noise reduction) is a technology that actively reduces acoustic noise in the air by generating a waveform that is an inverse form of the noise wave (e.g., having the same level and an inverted phase), also called an "antiphase" or "anti-noise" waveform. An ANC system generally uses one or more microphones to pick up an external noise reference signal, generates an anti-noise waveform from the noise reference signal, and reproduces the anti-noise waveform through one or more loudspeakers. This anti-noise waveform interferes destructively with the original noise wave to reduce the level of the noise that reaches the ear of the user.

SUMMARY

A method of audio signal processing according to a general configuration includes producing an anti-noise signal based on information from a first audio signal, separating a target component of a second audio signal from a noise component of the second audio signal to produce at least one among (A) a separated target component and (B) a separated noise component, and producing an audio output signal based on the anti-noise signal. In this method, the audio output signal is based on at least one among (A) the separated target component and (B) the separated noise component. Apparatus and other means for performing such a method, and computer-readable media having executable instructions for such a method, are also disclosed herein.

Also disclosed herein are variations of such a method, in which: the first audio signal is an error feedback signal; the second audio signal includes the first audio signal; the audio output signal is based on the separated target component; the second audio signal is a multichannel audio signal; the first audio signal is the separated noise component; and/or the audio output signal is mixed with a far-end communications signal. Apparatus and other means for performing such methods, and computer-readable media having executable instructions for such methods, are also disclosed herein.

DETAILED DESCRIPTION

Figure 1:
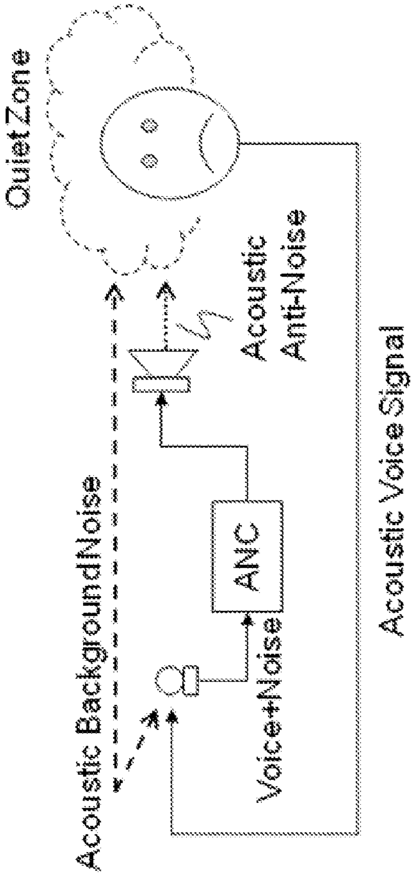
FIG. 1 (RELATED ART)
FIG. 1 illustrates an application of a basic ANC system.

The principles described herein may be applied, for example, to a headset or other communications or sound reproduction device that is configured to perform an ANC operation.

Unless expressly limited by its context, the term "signal" is used herein to indicate any of its ordinary meanings, including a state of a memory location (or set of memory locations) as expressed on a wire, bus, or other transmission medium. Unless expressly limited by its context, the term "generating" is used herein to indicate any of its ordinary meanings, such as computing or otherwise producing. Unless expressly limited by its context, the term "calculating" is used herein to indicate any of its ordinary meanings, such as computing, evaluating, smoothing, and/or selecting from a plurality of values. Unless expressly limited by its context, the term "obtaining" is used to indicate any of its ordinary meanings, such as calculating, deriving, receiving (e.g., from an external device), and/or retrieving (e.g., from an array of storage elements). Where the term "comprising" is used in the present description and claims, it does not exclude other elements or operations. The term "based on" (as in "A is based on B") is used to indicate any of its ordinary meanings, including the cases (i) "based on at least" (e.g., "A is based on at least B") and, if appropriate in the particular context, (ii) "equal to" (e.g., "A is equal to B"). Similarly, the term "in response to" is used to indicate any of its ordinary meanings, including "in response to at least."

References to a "location" of a microphone indicate the location of the center of an acoustically sensitive face of the microphone, unless otherwise indicated by the context. Unless indicated otherwise, any disclosure of an operation of an apparatus having a particular feature is also expressly intended to disclose a method having an analogous feature (and vice versa), and any disclosure of an operation of an apparatus according to a particular configuration is also expressly intended to disclose a method according to an analogous configuration (and vice versa). The term "configuration" may be used in reference to a method, apparatus, and/or system as indicated by its particular context. The terms "method," "process," "procedure," and "technique" are used generically and interchangeably unless otherwise indicated by the particular context. The terms "apparatus" and "device" are also used generically and interchangeably unless otherwise indicated by the particular context. The terms "element" and "module" are typically used to indicate a portion of a greater configuration. Unless expressly limited by its context, the term "system" is used herein to indicate any of its ordinary meanings, including "a group of elements that interact to serve a common purpose." Any incorporation by reference of a portion of a document shall also be understood to incorporate definitions of terms or variables that are referenced within the portion, where such definitions appear elsewhere in the document, as well as any figures referenced in the incorporated portion.

Active noise cancellation techniques may be applied to personal communications devices (e.g., cellular telephones, wireless headsets) and/or sound reproduction devices (e.g., earphones, headphones) to reduce acoustic noise from the surrounding environment. In such applications, the use of an ANC technique may reduce the level of background noise that reaches the ear (e.g., by up to twenty decibels or more) while delivering one or more desired sound signals, such as music, speech from a far-end speaker, etc.

A headset or headphone for communications applications typically includes at least one microphone and at least one loudspeaker, such that at least one microphone is used to capture the user's voice for transmission and at least one loudspeaker is used to reproduce the received far-end signal. In such a device, each microphone may be mounted on a boom or on an earcup, and each loudspeaker may be mounted in an earcup or earplug.

As an ANC system is typically designed to cancel any incoming acoustic signals, it tends to cancel the user's own voice as well the background noise. Such an effect may be undesirable, especially in a communications application. An ANC system may also tend to cancel other useful signals, such as a siren, car horn, or other sound that is intended to warn and/or to capture one's attention. Additionally, an ANC system may include good acoustic shielding (e.g., a padded circumaural earcup or a tight-fitting earplug) that passively blocks ambient sound from reaching the user's ear. Such shielding, which is typically especially in systems intended for use in industrial or aviation environments, may reduce signal power at high frequencies (e.g., frequencies greater than one kilohertz) by more than twenty decibels and therefore may also contribute to inhibiting the user from hearing her own voice. Such cancellation of the user's own voice is not natural and may cause an unusual or even unpleasant perception while using an ANC system in a communication scenario. For example, such cancellation may cause the user to perceive that the communications device is not working.

FIG. 1 illustrates an application of a basic ANC system that includes a microphone, a loudspeaker, and an ANC filter. The ANC filter receives a signal representing the environmental noise from the microphone and performs an ANC operation (e.g., a phase-inverting filtering operation, a least mean squares (LMS) filtering operation, a variant or derivative of LMS (e.g., filtered-x LMS), a digital virtual earth algorithm) on the microphone signal to create an anti-noise signal, and the system plays the anti-noise signal through the loudspeaker. In this example, the user experiences reduced environmental noise, which tends to enhance communication. However, as the acoustic anti-noise signal tends to cancel both voice and noise components, the user may also experience a reduction of the sound of her own voice, which can degrade the user's communication experience. Also the user may experience a reduction of other useful signals, such as a warning or alerting signal, which can compromise safety (e.g., the safety of the user and/or of others).

It may be desirable, in a communications application, to mix the sound of a user's own voice into the received signal that is played at the user's ear. The technique of mixing a microphone input signal into a loudspeaker output in a voice communications device, such as a headset or telephone, is called "sidetone." By permitting the user to hear her own voice, sidetone typically enhances user comfort and increases efficiency of the communication.

Figure 2:
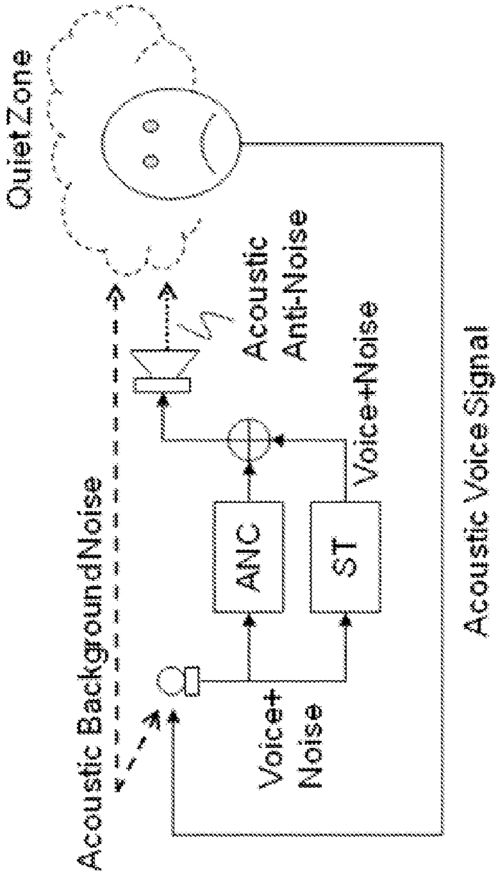
FIG. 2 illustrates an application of an ANC system that includes a sidetone module ST.

As an ANC system may inhibit the user's voice from reaching her own ear, one can implement such a sidetone feature in an ANC communications device. For example, a basic ANC system as shown in FIG. 1 may be modified to mix sound from the microphone into the signal that drives the loudspeaker. FIG. 2 illustrates an application of an ANC system that includes a sidetone module ST which generates a sidetone, based on the microphone signal, according to any sidetone technique. The generated sidetone is added to the anti-noise signal.

However, using sidetone features without sophisticated processing tends to weaken the effectiveness of the ANC operation. Since a conventional sidetone feature is designed to add any acoustic signal captured by the microphone to the loudspeaker, it will tend to add environmental noise as well as the user's own voice to the signal driving the loudspeaker, which reduces the effectiveness of the ANC operation. While the user of such a system may hear her own voice or other useful signals better, the user also tends to hear more noise than in an ANC system without a sidetone feature. Unfortunately, current ANC products do not address this problem.

Configurations disclosed herein include systems, methods, and apparatus having a source separation module or operation that separates a target component (e.g., the user's voice and/or another useful signal) from the environmental noise. Such a source separation module or operation may be used to support an enhanced sidetone (EST) approach which can deliver the sound of the user's own voice to the user's ear while retaining the effectiveness of the ANC operation. An EST approach may include separating the user's voice from a microphone signal and adding it into the signal played at the loudspeaker. Such a method allows the user to hear her own voice while the ANC operation continues to block ambient noise.

Figure 3A:
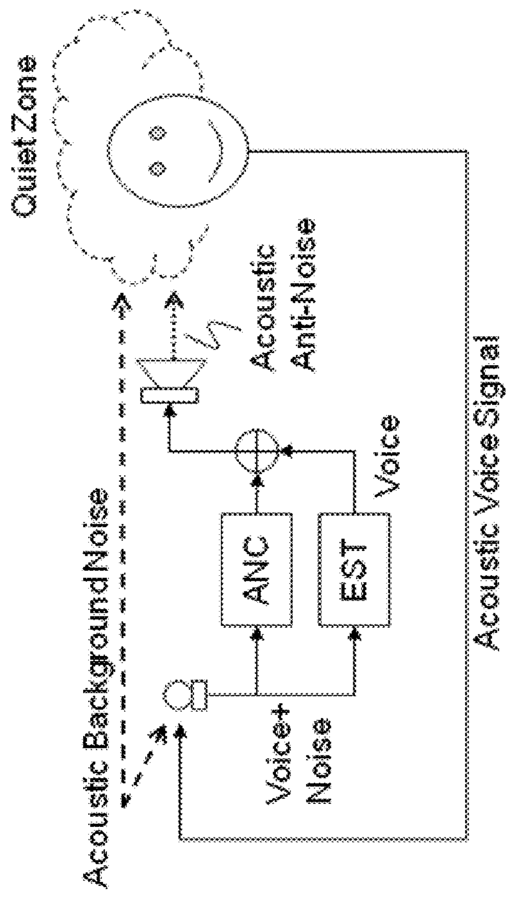
FIG. 3A illustrates an application of an enhanced sidetone approach to an ANC system.

FIG. 3A illustrates an application of an enhanced sidetone approach to an ANC system as shown in FIG. 1. The EST block (e.g., source separation module SS10 as described herein) separates a target component from the external microphone signal, and the separated target component is added to the signal to be played at the loudspeaker (i.e., the anti-noise signal). The ANC filter can perform noise reduction similarly as in the case without sidetone, but in this case the user can hear her own voice better.

An enhanced sidetone approach may be performed by mixing a separated voice component into an ANC loudspeaker output. Separation of the voice component from a noise component may be achieved using a general noise suppression method or a specialized multi-microphone noise separation method. The effectiveness of the voice-noise separation operation may vary depending on the complexity of the separation technique.

An enhanced sidetone approach may be used to enable the ANC user to hear her own voice without sacrificing the effectiveness of the ANC operation. Such a result may help to enhance the naturalness of the ANC system and create a more comfortable user experience.

Several different approaches may be used to implement an enhanced sidetone feature. FIG. 3A illustrates one general enhanced sidetone approach, which involves applying a separated voice component to a feedforward ANC system. Such an approach may be used to separate the user's voice and add it to the signal to be played at the loudspeaker. In general, this enhanced sidetone approach separates the voice component from the acoustic signal captured by the microphone and adds the separated voice component to the signal to be played at the loudspeaker.

Figure 3B:
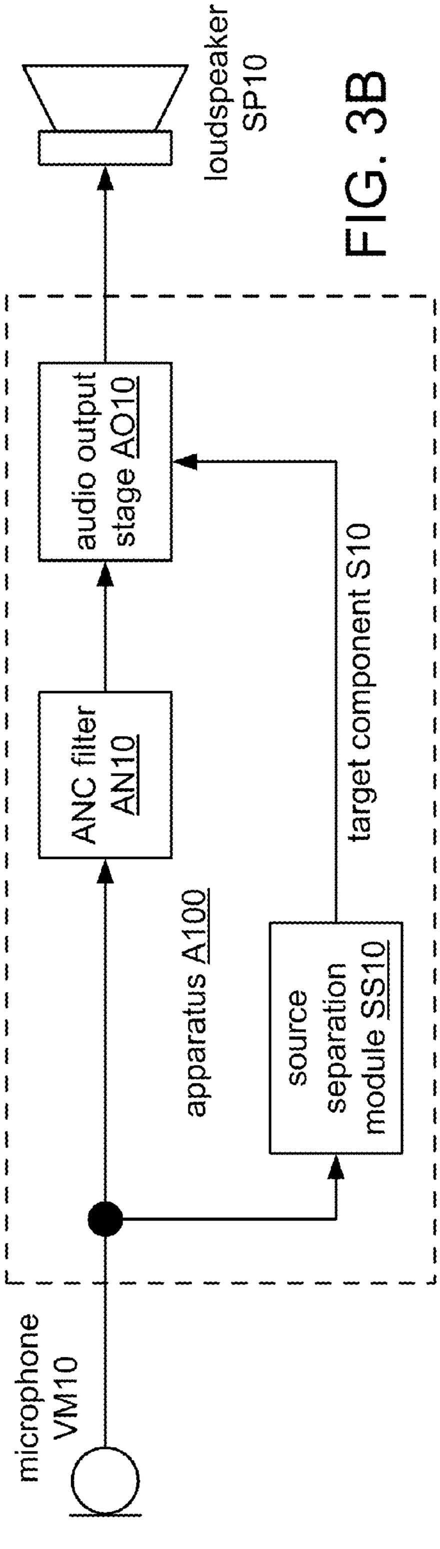
FIG. 3B shows a block diagram of an ANC system that includes an apparatus A100 according to a general configuration.

FIG. 3B shows a block diagram of an ANC system that includes a microphone VM10 arranged to sense the acoustic environment and to produce a corresponding representative signal. The ANC system also includes an apparatus A100 according to a general configuration which is arranged to process the microphone signal. It may be desirable to configure apparatus A100 to digitize the microphone signal (e.g., by sampling at a rate typically in the range of from 8 kHz to 1 MHz, such as 8, 12, 16, 44, or 192 kHz) and/or to perform one or more other pre-processing operations (e.g., spectral shaping or other filtering operations, automatic gain control, etc.) on the microphone signal in the analog and/or digital domains. Alternatively or additionally, the ANC system may include a pre-processing element (not shown) that is configured and arranged to perform one or more such operations on the microphone signal upstream of apparatus A100. (The preceding remarks concerning digitization and pre-processing of microphone signals are expressly applicable to each of the other ANC systems, apparatus, and microphone signals disclosed below.)

Apparatus A100 includes an ANC filter AN10 that is configured to receive the environmental sound signal and to perform an ANC operation (e.g., according to any desired digital and/or analog ANC technique) to produce a corresponding anti-noise signal. Such an ANC filter is typically configured to invert the phase of the environmental noise signal and may also be configured to equalize the frequency response and/or to match or minimize the delay. Examples of ANC operations that may be performed by ANC filter AN10 to produce the anti-noise signal include a phase-inverting filtering operation, a least mean squares (LMS) filtering operation, a variant or derivative of LMS (e.g., filtered-x LMS, as described in U.S. Pat. Appl. Publ. No. 2006/0069566 (Nadjar et al.) and elsewhere), and a digital virtual earth algorithm (e.g., as described in U.S. Pat. No. 5,105,377 (Ziegler)). ANC filter AN10 may be configured to perform the ANC operation in the time domain and/or in a transform domain (e.g., a Fourier transform or other frequency domain).

Apparatus A100 also includes a source separation module SS10 that is configured to separate a desired sound component (a "target component") from a noise component of the environmental noise signal (possibly by removing or otherwise suppressing the noise component) and to produce a separated target component S10. The target component may be the user's voice and/or another useful signal. In general, source separation module SS10 may be implemented using any available noise reduction technology, including single-microphone noise reduction technology, dual-or multiple-microphone noise reduction technology, directional-microphone noise reduction technology, and/or signal separation or beamforming technology. Implementations of source separation module SS10 that perform one or more voice detection and/or spatially selective processing operations are expressly contemplated, and examples of such implementations are described herein.

Many useful signals, such as a siren, car horn, alarm, or other sound that is intended to warn, alert, and/or to capture one's attention, are typically tonal components that have narrow bandwidths in comparison to other sound signals such as noise components. It may be desirable to configure source separation module SS10 to separate a target component that appears only within a particular frequency range (e.g., from about 500 or 1000 Hertz to about two or three kilohertz), has a narrow bandwidth (e.g., not greater than about fifty, one hundred, or two hundred Hertz), and/or has a sharp attack profile (e.g., has an increase in energy not less than about fifty, seventy-five, or one hundred percent from one frame to the next). Source separation module SS10 may be configured to operate in the time domain and/or in a transform domain (e.g., a Fourier or other frequency domain).

Apparatus A100 also includes an audio output stage AO10 that is configured to produce an audio output signal to drive loudspeaker SP10 that is based on the anti-noise signal. For example, audio output stage AO10 may be configured to produce the audio output signal by converting a digital anti-noise signal to analog; by amplifying, applying a gain to, and/or controlling a gain of the anti-noise signal; by mixing the anti-noise signal with one or more other signals (e.g., a music signal or other reproduced audio signal, a far-end communications signal, and/or a separated target component); by filtering the anti-noise and/or output signals; by providing impedance matching to loudspeaker SP10; and/or by performing any other desired audio processing operation. In this example, audio output stage AO10 is also configured to apply target component S10 as a sidetone signal by mixing it with (e.g., adding it to) the anti-noise signal. Audio output stage AO10 may be implemented to perform such mixing in the digital domain or in the analog domain.

Figure 4A:
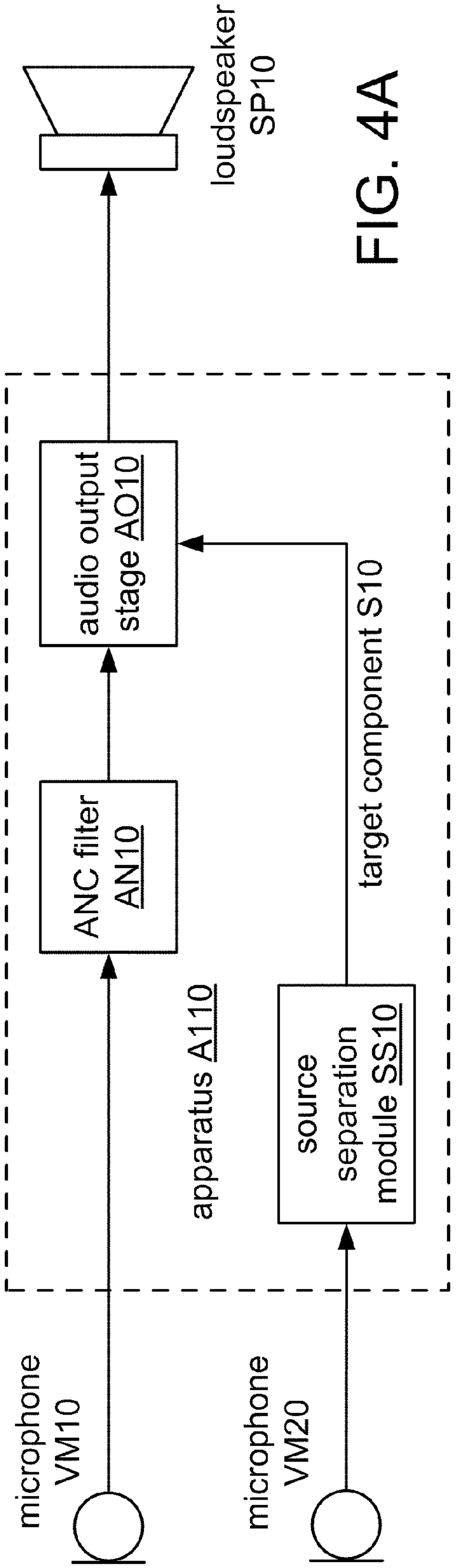
FIG. 4A shows a block diagram of an ANC system that includes two different microphones (or two different sets of microphones) VM10 and VM20 and an apparatus A110 similar to apparatus A100.

FIG. 4A shows a block diagram of an ANC system that includes two different microphones (or two different sets of microphones) VM10 and VM20 and an apparatus A110 similar to apparatus A100. In this example, both of microphones VM10 and VM20 are arranged to receive acoustic environmental noise, and microphone(s) VM20 is (are) also positioned and/or directed to receive the user's voice more directly than microphone(s) VM10. For example, a microphone VM10 may be positioned at the middle or back of an earcup with a microphone VM20 being positioned at the front of the earcup. Alternatively, a microphone VM10 may be positioned on an earcup and a microphone VM20 may be positioned on a boom or other structure extending toward the user's mouth. In this example, source separation module SS10 is arranged to produce target component S10 based on information from the signal produced by microphone(s) VM20.

Figure 4B:
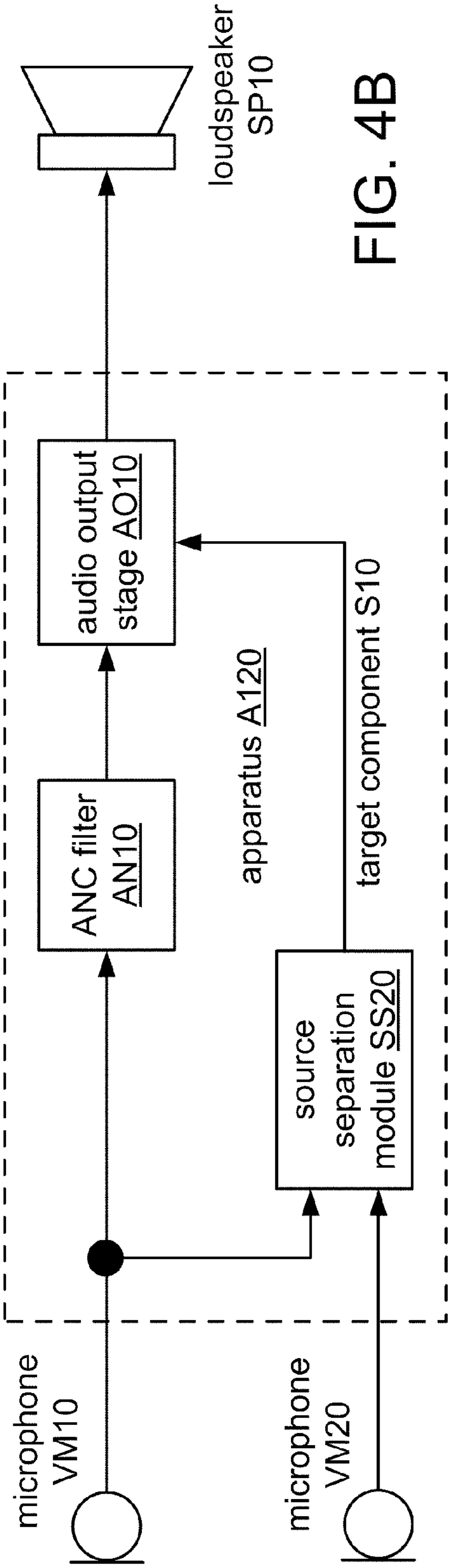
FIG. 4B shows a block diagram of an ANC system that includes an implementation A120 of apparatus A100 and A110.

FIG. 4B shows a block diagram of an ANC system that includes an implementation A120 of apparatus A100 and A110. Apparatus A120 includes an implementation SS20 of source separation module SS10 that is configured to perform a spatially selective processing operation on a multichannel audio signal to separate a voice component (and/or one or more other target components) from a noise component. Spatially selective processing is a class of signal processing methods that separate signal components of a multichannel audio signal based on direction and/or distance, and examples of source separation module SS20 that are configured to perform such an operation are described in more detail below. In the example of FIG. 4B, the signal from microphone VM10 is one channel of the multichannel audio signal, and the signal from microphone VM20 is another channel of the multichannel audio signal.

Figure 5A:
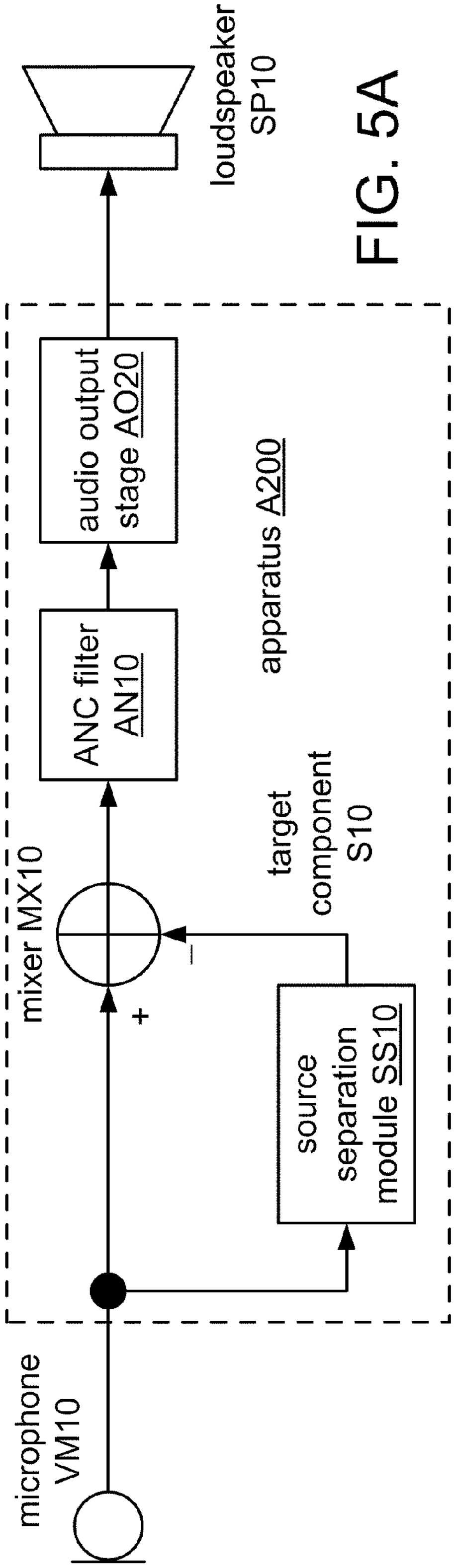
FIG. 5A shows a block diagram of an ANC system that includes an apparatus A200 according to another general configuration.

It may be desirable to configure an enhanced sidetone ANC apparatus such that the anti-noise signal is based on an environmental noise signal that has been processed to attenuate the target component. Removing the separated voice component from the environmental noise signal upstream of ANC filter AN10, for example, may cause ANC filter AN10 to produce an anti-noise signal that has less of a cancellation effect on the sound of the user's voice. FIG. 5A shows a block diagram of an ANC system that includes an apparatus A200 according to such a general configuration. Apparatus A200 includes a mixer MX10 that is configured to subtract target component S10 from the environmental noise signal. Apparatus A200 also includes an audio output stage AO20 that is configured according to the description of audio output stage AO10 herein, except for mixing of the anti-noise and target signals.

Figure 5B:
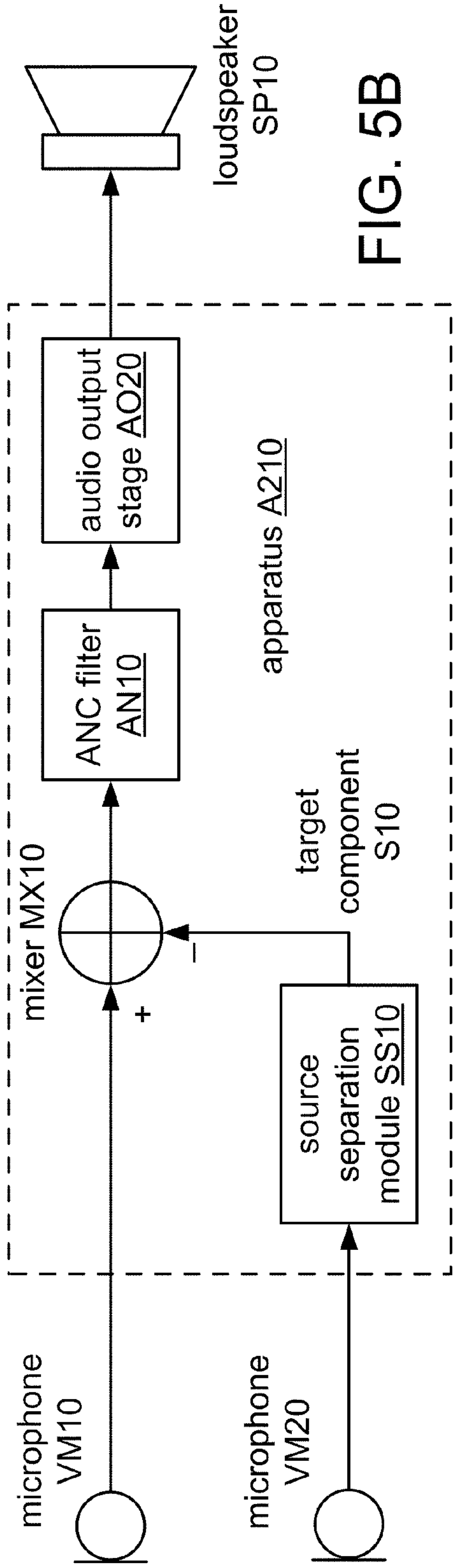
FIG. 5B shows a block diagram of an ANC system that includes two different microphones (or two different sets of microphones) VM10 and VM20 and an apparatus A210 similar to apparatus A200.
Figure 6A:
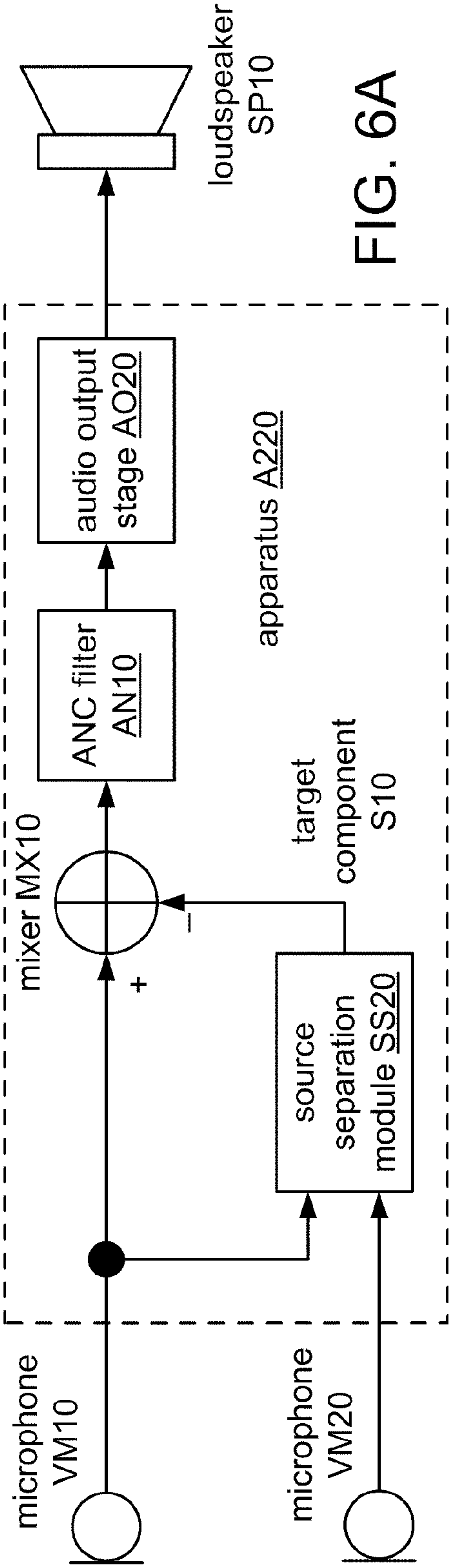
FIG. 6A shows a block diagram of an ANC system that includes an implementation A220 of apparatus A200 and A210.

FIG. 5B shows a block diagram of an ANC system that includes two different microphones (or two different sets of microphones) VM10 and VM20, which are arranged and positioned as described above with reference to FIG. 4A, and an apparatus A210 that is similar to apparatus A200. In this example, source separation module SS10 is arranged to produce target component S10 based on information from the signal produced by microphone(s) VM20. FIG. 6A shows a block diagram of an ANC system that includes an implementation A220 of apparatus A200 and A210. Apparatus A220 includes an instance of source separation module SS20 that is configured as described above to perform a spatially selective processing operation on the signals from microphones VM10 and VM20 to separate the voice component (and/or one or more other useful signal components) from a noise component.

Figure 6B:
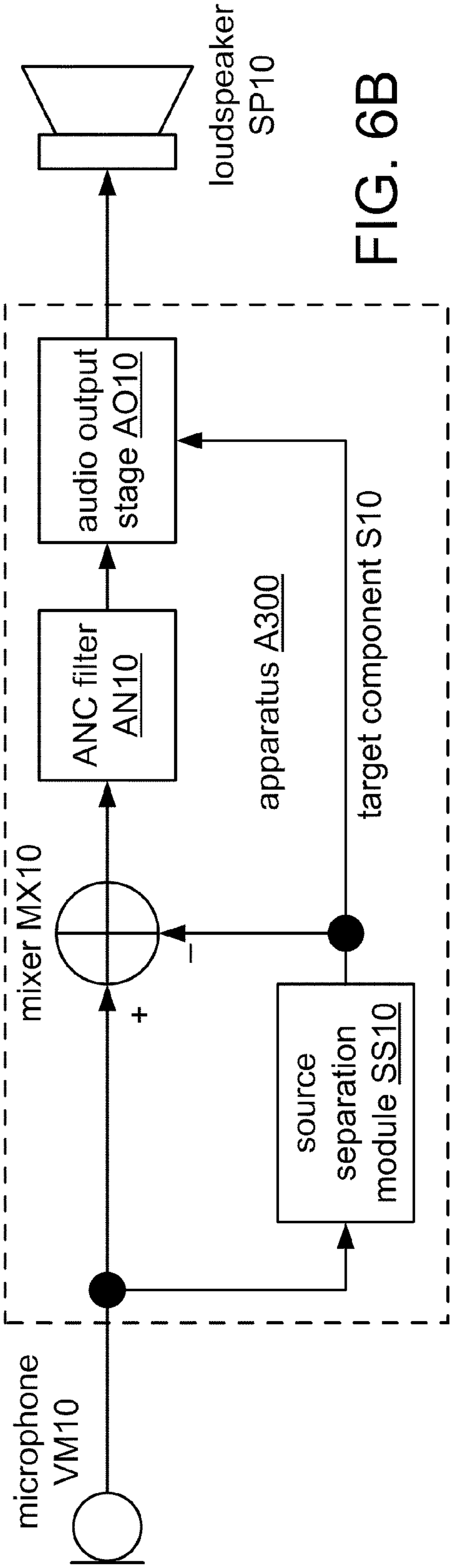
FIG. 6B shows a block diagram of an ANC system that includes an implementation A300 of apparatus A100 and A200.
Figure 7A:
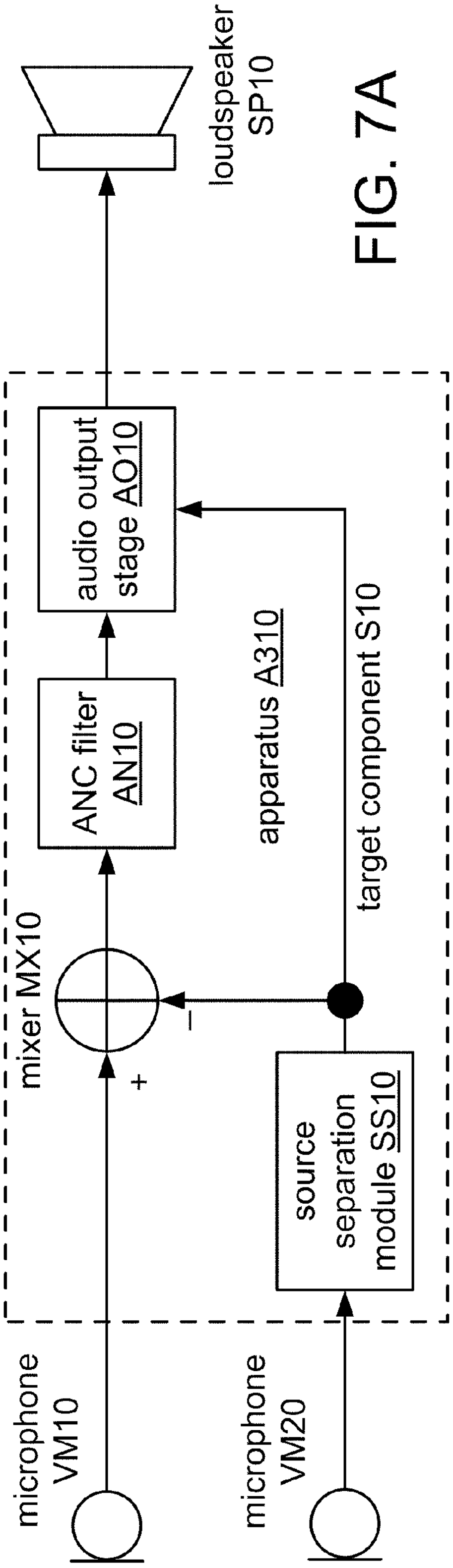
FIG. 7A shows a block diagram of an ANC system that includes an implementation A310 of apparatus A110 and A210.
Figure 7B:
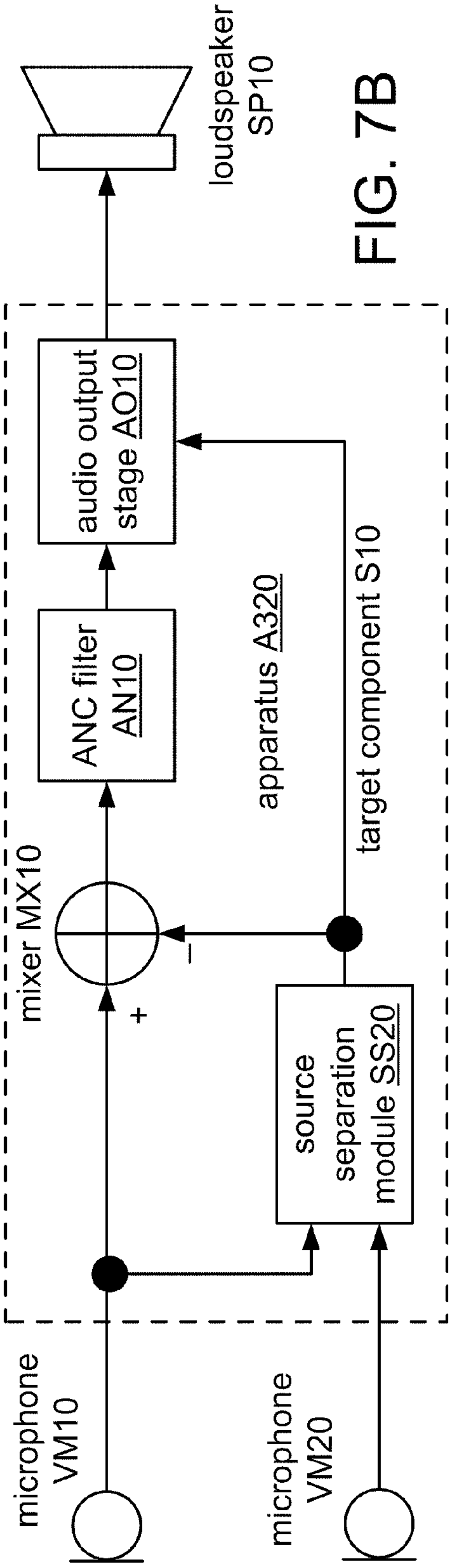
FIG. 7B shows a block diagram of an ANC system that includes an implementation A320 of apparatus A120 and A220.

FIG. 6B shows a block diagram of an ANC system that includes an implementation A300 of apparatus A100 and A200 that performs both a sidetone addition operation as described above with reference to apparatus A100 and a target component attenuation operation as described above with reference to apparatus A200. FIG. 7A shows a block diagram of an ANC system that includes a similar implementation A310 of apparatus A110 and A210, and FIG. 7B shows a block diagram of an ANC system that includes a similar implementation A320 of apparatus A120 and A220.

The examples shown in FIGS. 3A to 7B relate to a type of ANC system that uses one or more microphones to pick up acoustic noise from the background. Another type of ANC system uses a microphone to pick up an acoustic error signal (also called a "residual" or "residual error" signal) after the noise reduction, and feeds this error signal back to the ANC filter. This type of ANC system is called a feedback ANC system. An ANC filter in a feedback ANC system is typically configured to reverse the phase of the error feedback signal and may also be configured to integrate the error feedback signal, equalize the frequency response, and/or to match or minimize the delay.

Figure 8:
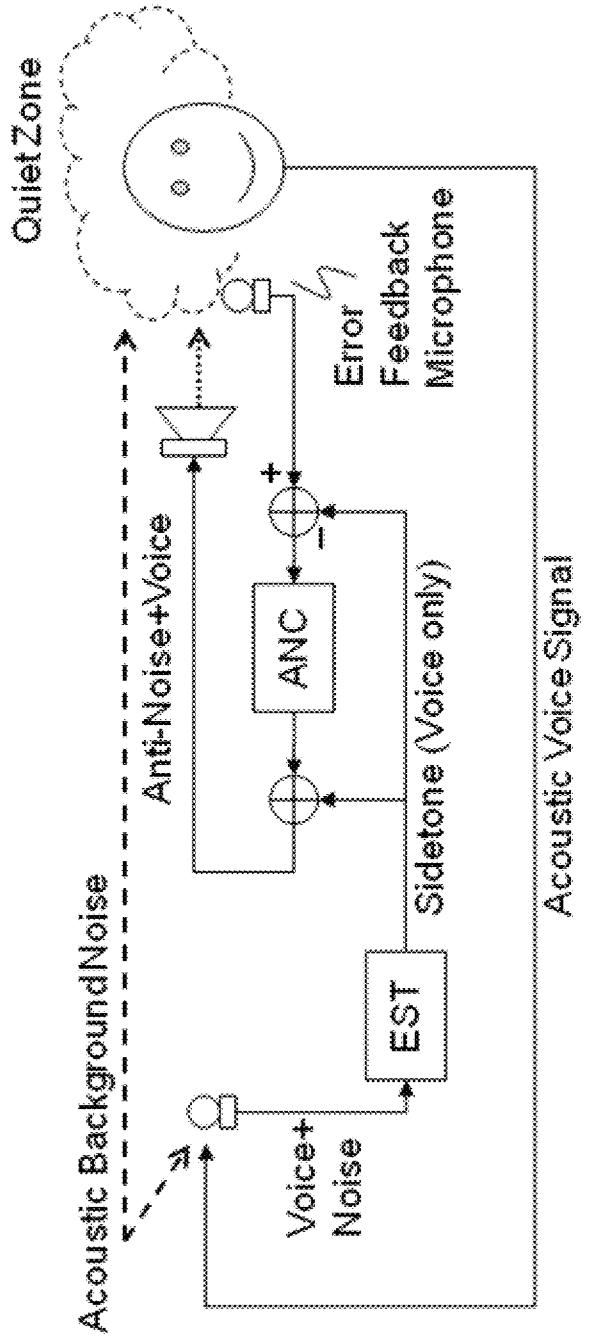
FIG. 8 illustrates an application of an enhanced sidetone approach to a feedback ANC system.

As shown in the schematic of FIG. 8, an enhanced sidetone approach may be implemented in a feedback ANC system to apply a separated voice component in a feedback manner. This approach subtracts the voice component from the error feedback signal upstream from the ANC filter and adds the voice component to the anti-noise signal. Such an approach may be configured to both add the voice component to the audio output signal, and subtract the voice component from the error signal.

Figure 9B:
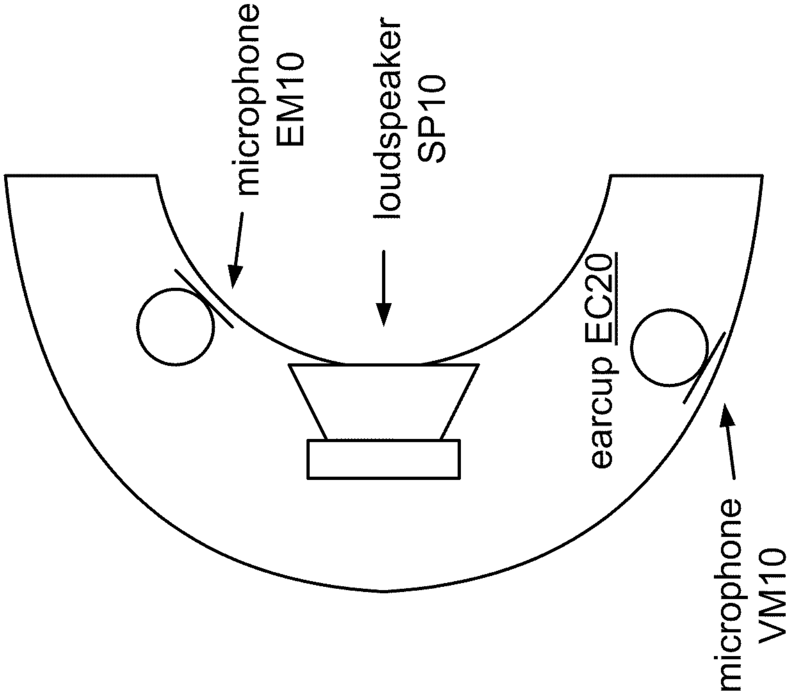
FIG. 9B shows a cross-section of an implementation EC20 of earcup EC10.
Figure 9A:
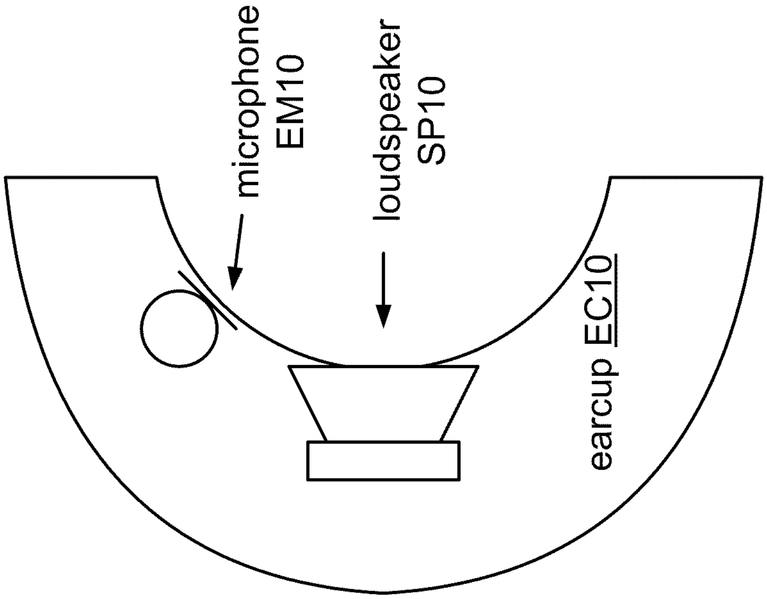
FIG. 9A shows a cross-section of an earcup EC10.

In a feedback ANC system, it may be desirable for the error feedback microphone to be disposed within the acoustic field generated by the loudspeaker. For example, it may be desirable for the error feedback microphone to be disposed with the loudspeaker within the earcup of a headphone. It may also be desirable for the error feedback microphone to be acoustically insulated from the environmental noise. FIG. 9A shows a cross-section of an earcup EC10 that includes a loudspeaker SP10 arranged to reproduce the signal to the user's ear and a microphone EM10 arranged to receive the acoustic error signal (e.g., via an acoustic port in the earcup housing). It may be desirable in such case to insulate microphone EM10 from receiving mechanical vibrations from loudspeaker SP10 through the material of the earcup. FIG. 9B shows a cross-section of an implementation EC20 of earcup EC10 that includes a microphone VM10 arranged to receive the environmental noise signal that includes the user's voice.

Figure 10A:
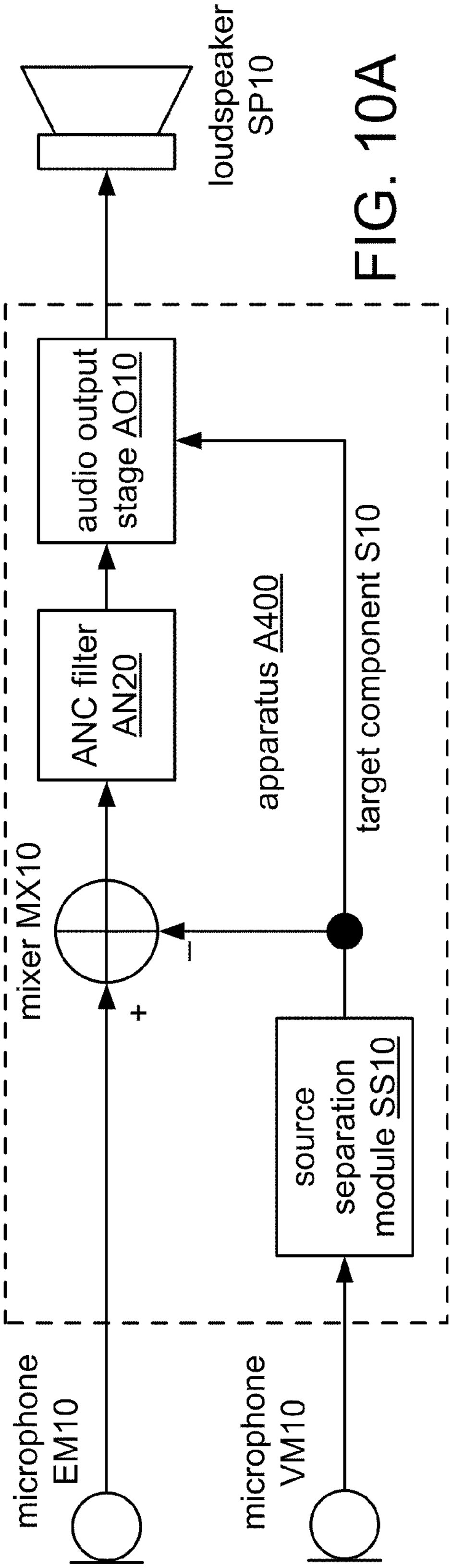
FIG. 10A shows a block diagram of an ANC system that includes an implementation A400 of apparatus A100 and A200.
Figure 10B:
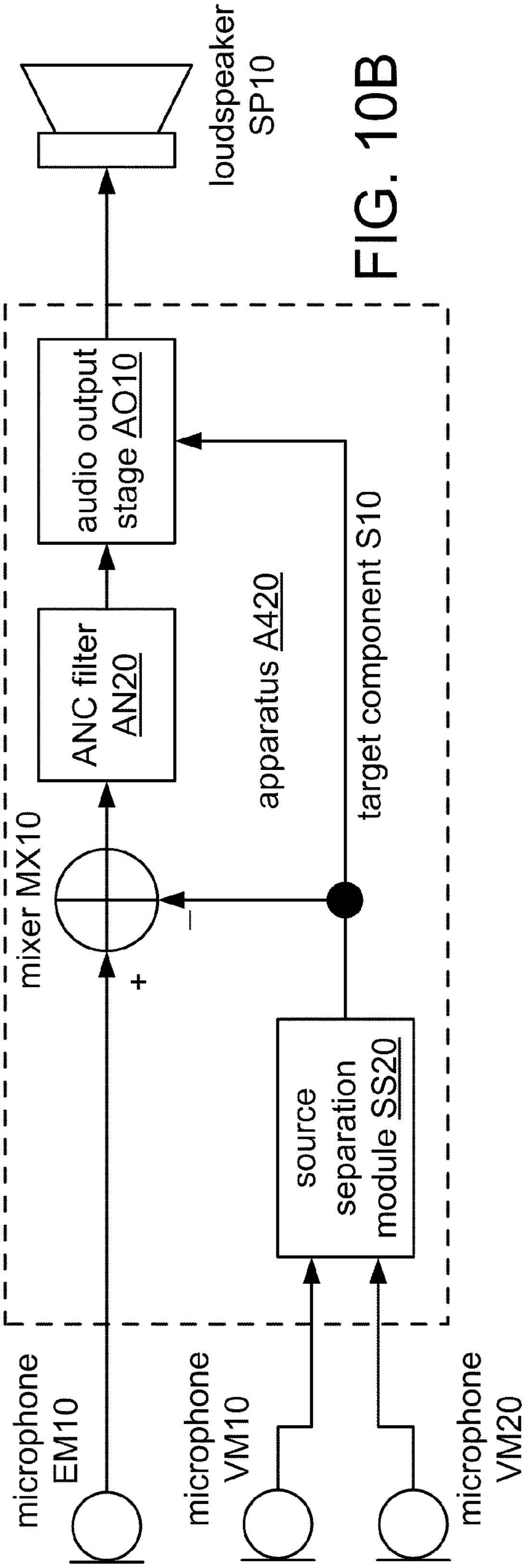
FIG. 10B shows a block diagram of an ANC system that includes an implementation A420 of apparatus A120 and A220.

FIG. 10A shows a block diagram of an ANC system that includes one or more microphones EM10, which are arranged to sense an acoustic error signal and to produce a corresponding representative error feedback signal, and an apparatus A400 according to a general configuration that includes an implementation AN20 of ANC filter AN10. In this case, mixer MX10 is arranged to subtract target component S10 from the error feedback signal, and ANC filter AN20 is arranged to produce the anti-noise signal based on that result. ANC filter AN20 is configured as described above with reference to ANC filter AN10 and may also be configured to compensate for an acoustic transfer function between loudspeaker SP10 and microphone EM10. Audio output stage AO10 is also configured in this apparatus to mix target component S10 into the loudspeaker output signal that is based on the anti-noise signal. FIG. 10B shows a block diagram of an ANC system that includes two different microphones (or two different sets of microphones) VM10 and VM20, which are arranged and positioned as described above with reference to FIG. 4A, and an implementation A420 of apparatus A400. Apparatus A420 includes an instance of source separation module SS20 that is configured as described above to perform a spatially selective processing operation on the signals from microphones VM10 and VM20 to separate the voice component (and/or one or more other useful signal components) from a noise component.

Figure 11A:
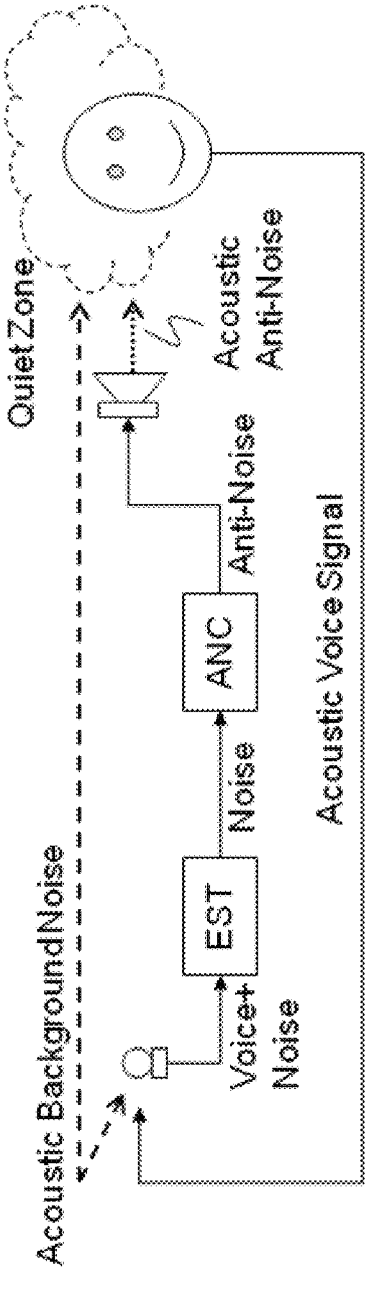
FIG. 11A shows an example of a feedforward ANC system that includes a separated noise component.
Figure 11B:
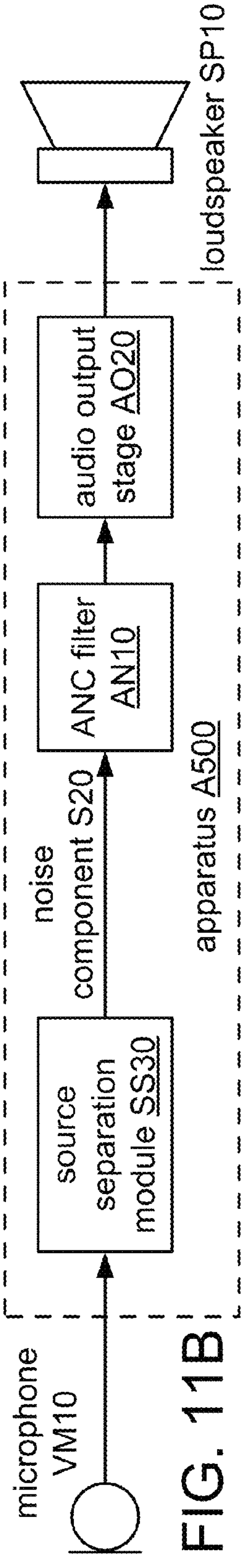
FIG. 11B shows a block diagram of an ANC system that includes an apparatus A500 according to a general configuration.

The approaches shown in the schematics of FIGS. 3A and 8 work by separating the sound of the user's voice from one or more microphone signals and adding it back to the loudspeaker signal. On the other hand, one can separate the noise component from an external microphone signal and directly feed it to the noise reference input of the ANC filter. In this case, the ANC system inverts the noise-only signal and plays to the loudspeaker so that cancellation of the sound of the user's voice by the ANC operation may be avoided. FIG. 11A shows an example of such a feedforward ANC system that includes a separated noise component. FIG. 11B shows a block diagram of an ANC system that includes an apparatus A500 according to a general configuration. Apparatus A500 includes an implementation SS30 of source separation module SS10 that is configured to separate target and noise components of environmental signals from one or more microphones VM10 (possibly by removing or otherwise suppressing the voice component) and outputs a corresponding noise component S20 to ANC filter AN10. Apparatus A500 may also be implemented such that ANC filter AN10 is arranged to produce the anti-noise signal based on a mixture of an environmental noise signal (e.g., based on a microphone signal) and separated noise component S20.

Figure 11C:
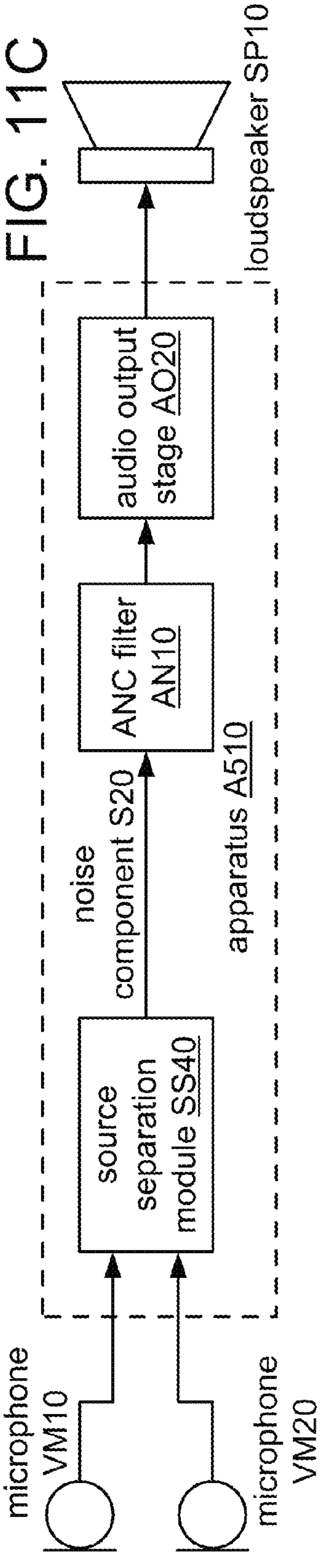
FIG. 11C shows a block diagram of an ANC system that includes an implementation A510 of apparatus A500.

FIG. 11C shows a block diagram of an ANC system that includes two different microphones (or two different sets of microphones) VM10 and VM20, which are arranged and positioned as described above with reference to FIG. 4A, and an implementation A510 of apparatus A500. Apparatus A510 includes an implementation SS40 of source separation module SS20 and SS30 that is configured to perform a spatially selective processing operation (e.g., according to one or more of the examples as described herein with reference to source separation module SS20) to separate target and noise components of the environmental signals and to output a corresponding noise component S20 to ANC filter AN10.

Figure 12A:
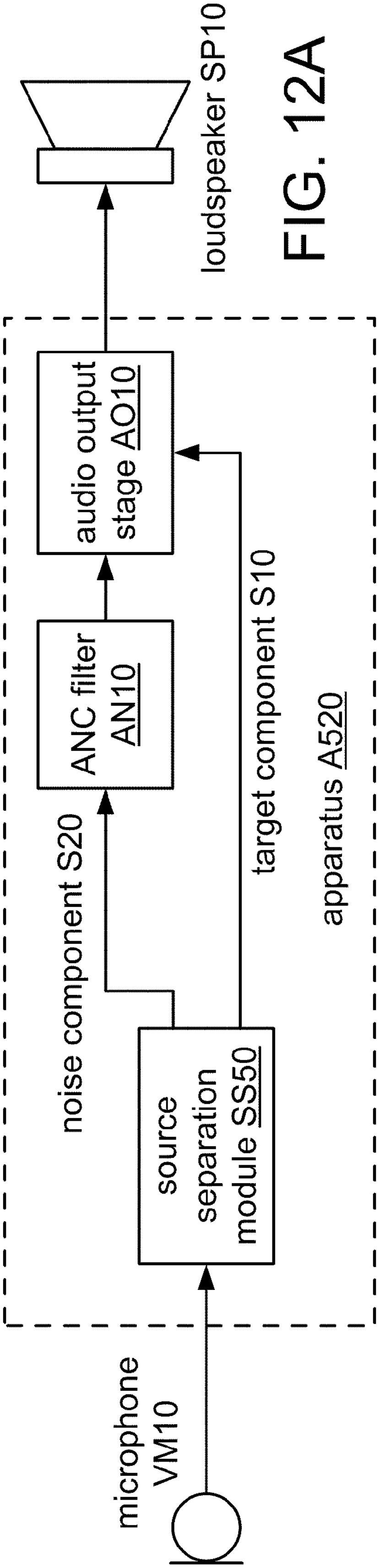
FIG. 12A shows a block diagram of an ANC system that includes an implementation A520 of apparatus A100 and A500.

FIG. 12A shows a block diagram of an ANC system that includes an implementation A520 of apparatus A500. Apparatus A520 includes an implementation SS50 of source separation module SS10 and SS30 that is configured to separate target and noise components of environmental signals from one or more microphones VM10 to produce a corresponding target component S10 and a corresponding noise component S20. Apparatus A520 also includes an instance of ANC filter AN10 that is configured to produce an anti-noise signal based on noise component S20 and an instance of audio output stage AO10 that is configured to mix target component S10 with the anti-noise signal.

Figure 12B:
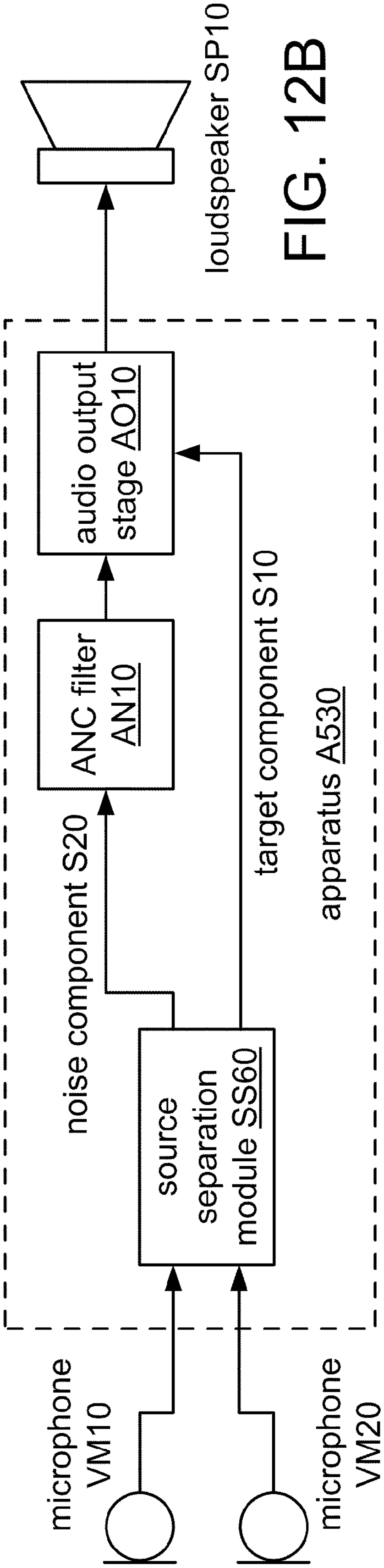
FIG. 12B shows a block diagram of an ANC system that includes an implementation A530 of apparatus A520.

FIG. 12B shows a block diagram of an ANC system that includes two different microphones (or two different sets of microphones) VM10 and VM20, which are arranged and positioned as described above with reference to FIG. 4A, and an implementation A530 of apparatus A520. Apparatus A530 includes an implementation SS60 of source separation module SS20 and SS40 that is configured to perform a spatially selective processing operation (e.g., according to one or more of the examples as described herein with reference to source separation module SS20) to separate target and noise components of the environmental signals and to produce a corresponding target component S10 and a corresponding noise component S20.

An earpiece or other headset having one or more microphones is one kind of portable communications device that may include an implementation of an ANC system as described herein. Such a headset may be wired or wireless. For example, a wireless headset may be configured to support half- or full-duplex telephony via communication with a telephone device such as a cellular telephone handset (e.g., using a version of the Bluetooth™ protocol as promulgated by the Bluetooth Special Interest Group, Inc., Bellevue, Wash).

Figures 13A, 13B, 13C, 13D:
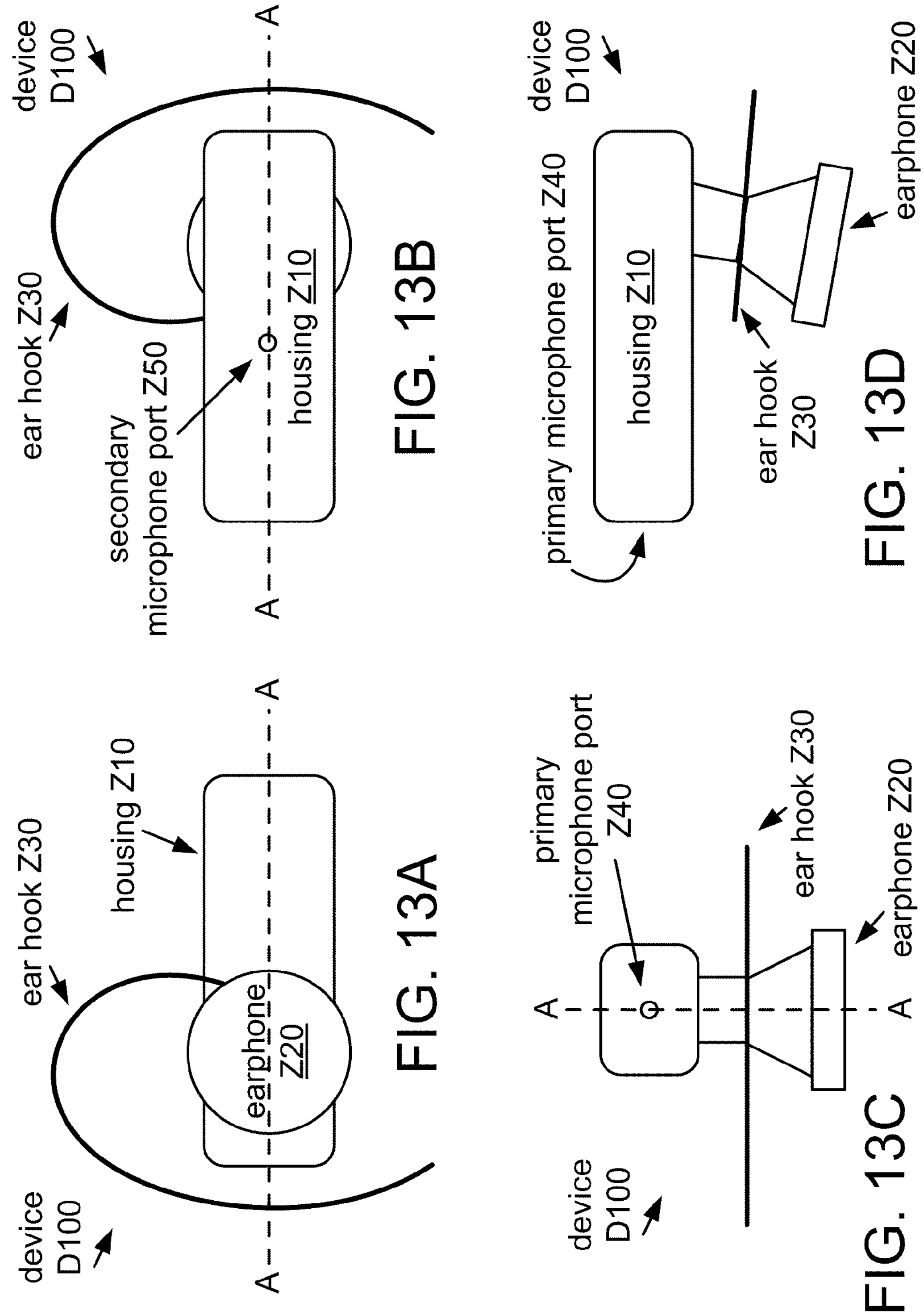
FIGS. 13A to 13D show various views of a multi-microphone portable audio sensing device D100.

FIGS. 13A to 13D show various views of a multi-microphone portable audio sensing device D100 that may include an implementation of any of the ANC systems described herein. Device D100 is a wireless headset that includes a housing Z10 which carries a two-microphone array and an earphone Z20 that extends from the housing and includes loudspeaker SP10. In general, the housing of a headset may be rectangular or otherwise elongated as shown in FIGS. 13A, 13B, and 13D (e.g., shaped like a miniboom) or may be more rounded or even circular. The housing may also enclose a battery and a processor and/or other processing circuitry (e.g., a printed circuit board and components mounted thereon) configured to perform an enhanced ANC method as described herein (e.g., method M100, M200, M300, M400, or M500 as discussed below). The housing may also include an electrical port (e.g., a mini-Universal Serial Bus (USB) or other port for battery charging and/or data transfer) and user interface features such as one or more button switches and/or LEDs. Typically the length of the housing along its major axis is in the range of from one to three inches.

Figure 13E:
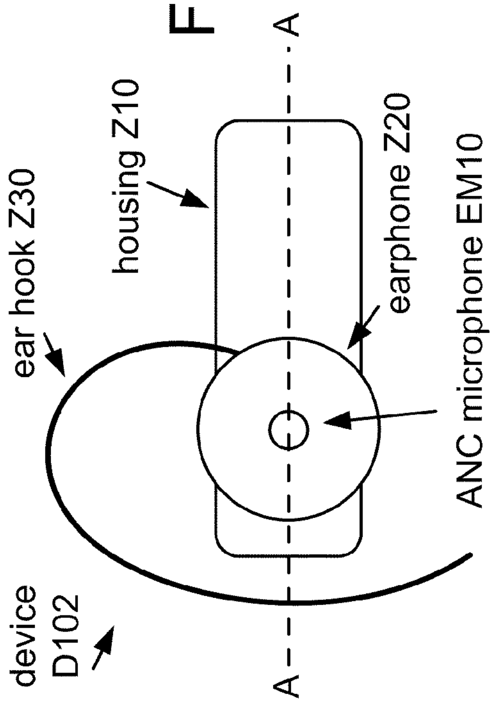
FIGS. 13E to 13G show various views of an alternate implementation D102 of device D100.
Figure 13F:
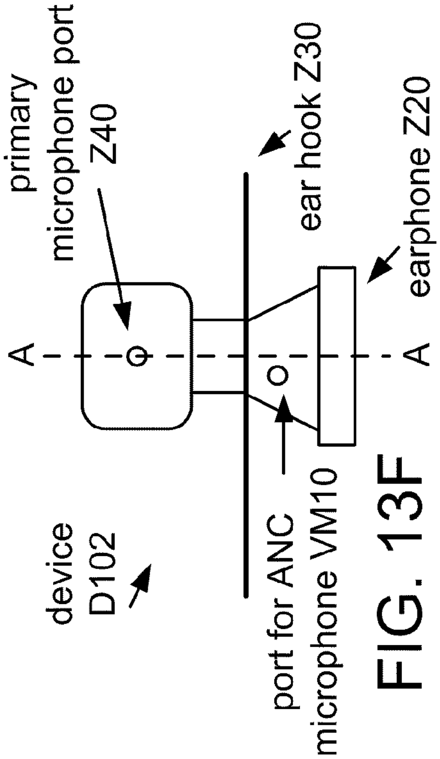
Figure 13G:
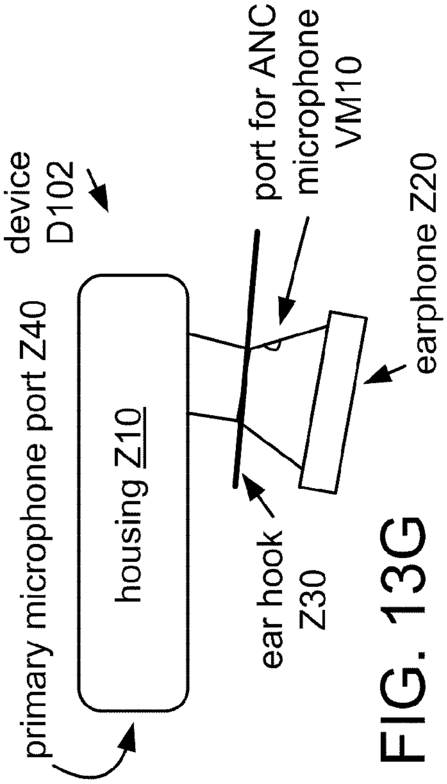

Typically each microphone of array R100 is mounted within the device behind one or more small holes in the housing that serve as an acoustic port. FIGS. 13B to 13D show the locations of the acoustic port Z40 for the primary microphone of the array of device D100 and the acoustic port Z50 for the secondary microphone of the array of device D100. It may be desirable to use the secondary microphone of device D100 as microphone VM10, or to use the primary and secondary microphones of device D100 as microphones VM20 and VM10, respectively. FIGS. 13E to 13G show various views of an alternate implementation D102 of device D100 that includes microphones EM 10 (e.g., as discussed above with reference to FIGS. 9A and 9B) and VM10. Device D102 may be implemented to include either or both of microphones VM10 and EM10 (e.g., according to the particular ANC method to be performed by the device).

A headset may also include a securing device, such as ear hook Z30, which is typically detachable from the headset. An external ear hook may be reversible, for example, to allow the user to configure the headset for use on either ear. Alternatively, the earphone of a headset may be designed as an internal securing device (e.g., an earplug) which may include a removable earpiece to allow different users to use an earpiece of different size (e.g., diameter) for better fit to the outer portion of the particular user's ear canal. For a feedback ANC system, the earphone of a headset may also include a microphone arranged to pick up an acoustic error signal (e.g., microphone EM10).

Figures 14A, 14B, 14C, 14D:
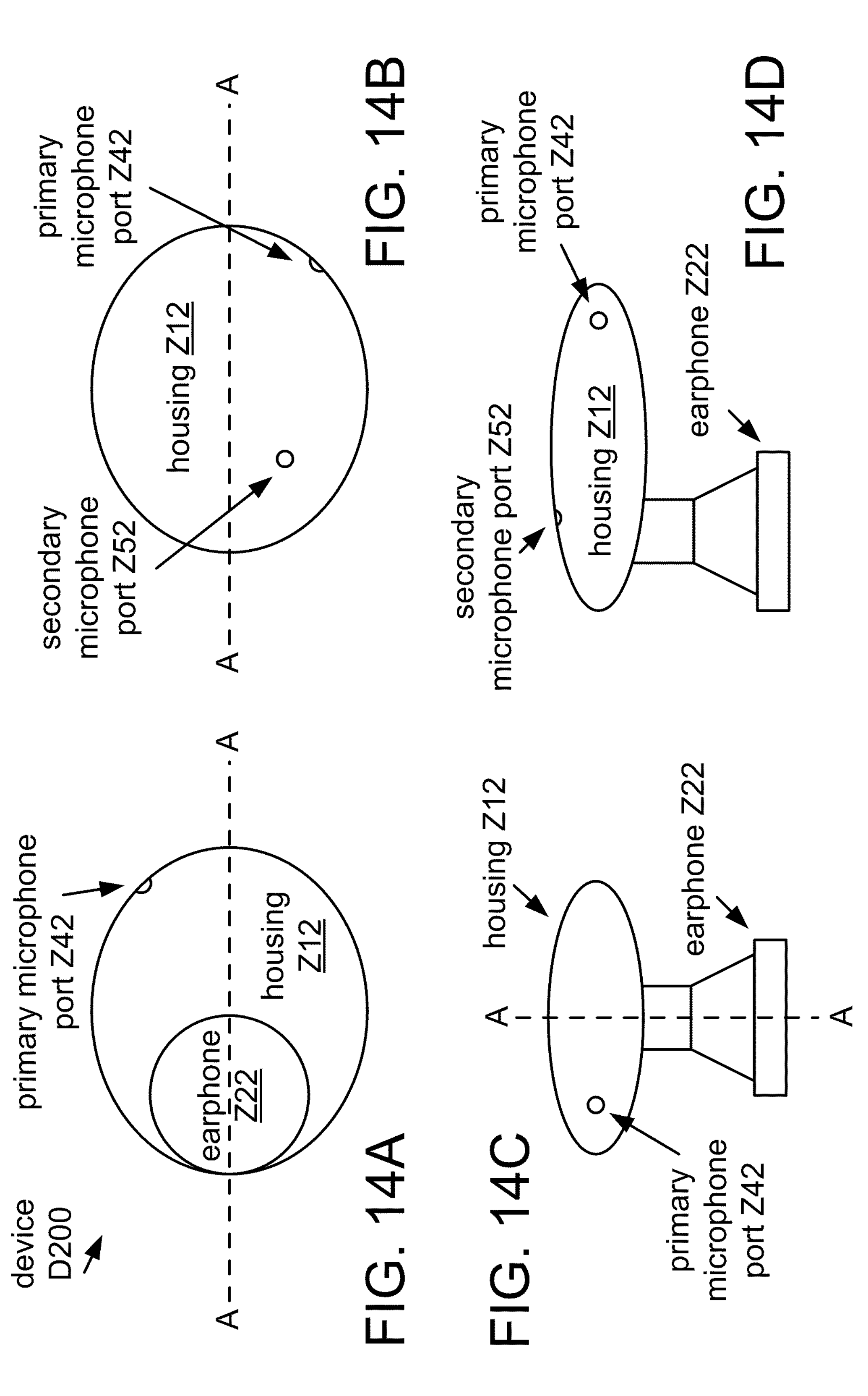
FIGS. 14A to 14D show various views of a multi-microphone portable audio sensing device D200.
Figure 14E:
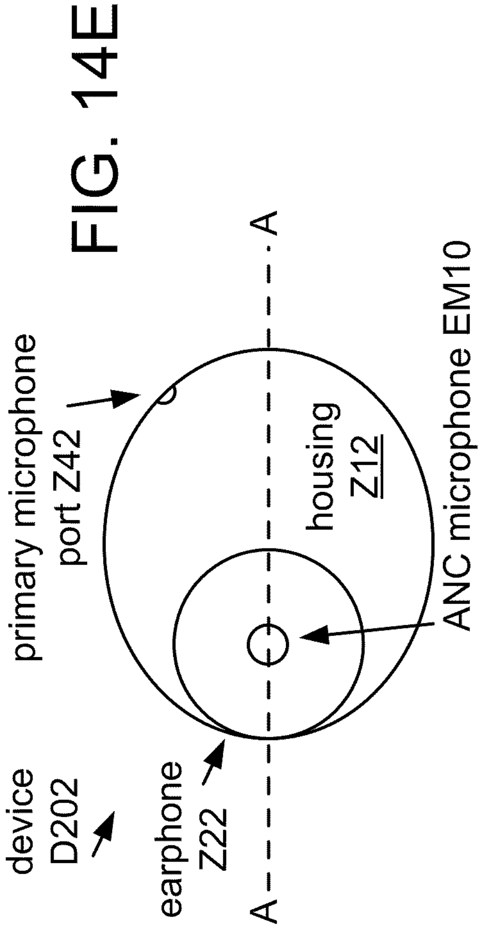
FIGS. 14E and 14F show various views of an alternate implementation D202 of device D200.
Figure 14F:
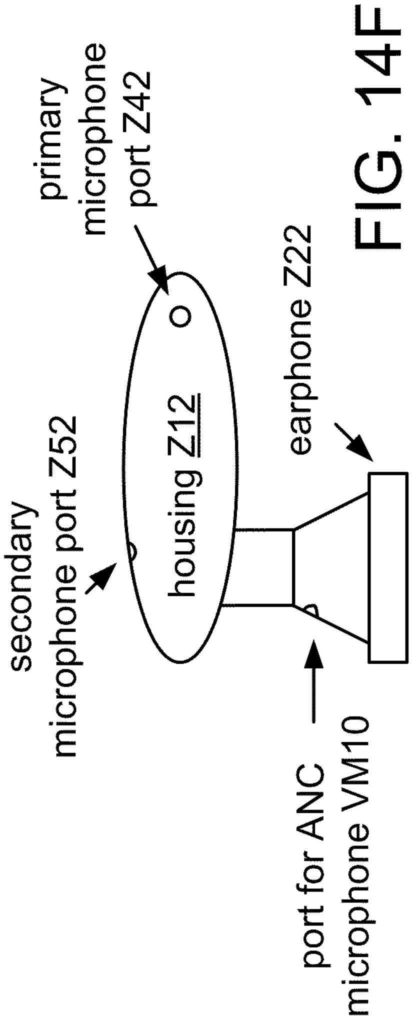

FIGS. 14A to 14D show various views of a multi-microphone portable audio sensing device D200 that is another example of a wireless headset that may include an implementation of any of the ANC systems described herein. Device D200 includes a rounded, elliptical housing Z12 and an earphone Z22 that may be configured as an earplug and includes loudspeaker SP10. FIGS. 14A to 14D also show the locations of the acoustic port Z42 for the primary microphone and the acoustic port Z52 for the secondary microphone of the array of device D200. It is possible that secondary microphone port Z52 may be at least partially occluded (e.g., by a user interface button). It may be desirable to use the secondary microphone of device D200 as microphone VM10, or to use the primary and secondary microphones of device D200 as microphones VM20 and VM10, respectively. FIGS. 14E and 14F show various views of an alternate implementation D202 of device D200 that includes microphones EM10 (e.g., as discussed above with reference to FIGS. 9A and 9B) and VM10. Device D202 may be implemented to include either or both of microphones VM10 and EM10 (e.g., according to the particular ANC method to be performed by the device).

Figure 15:
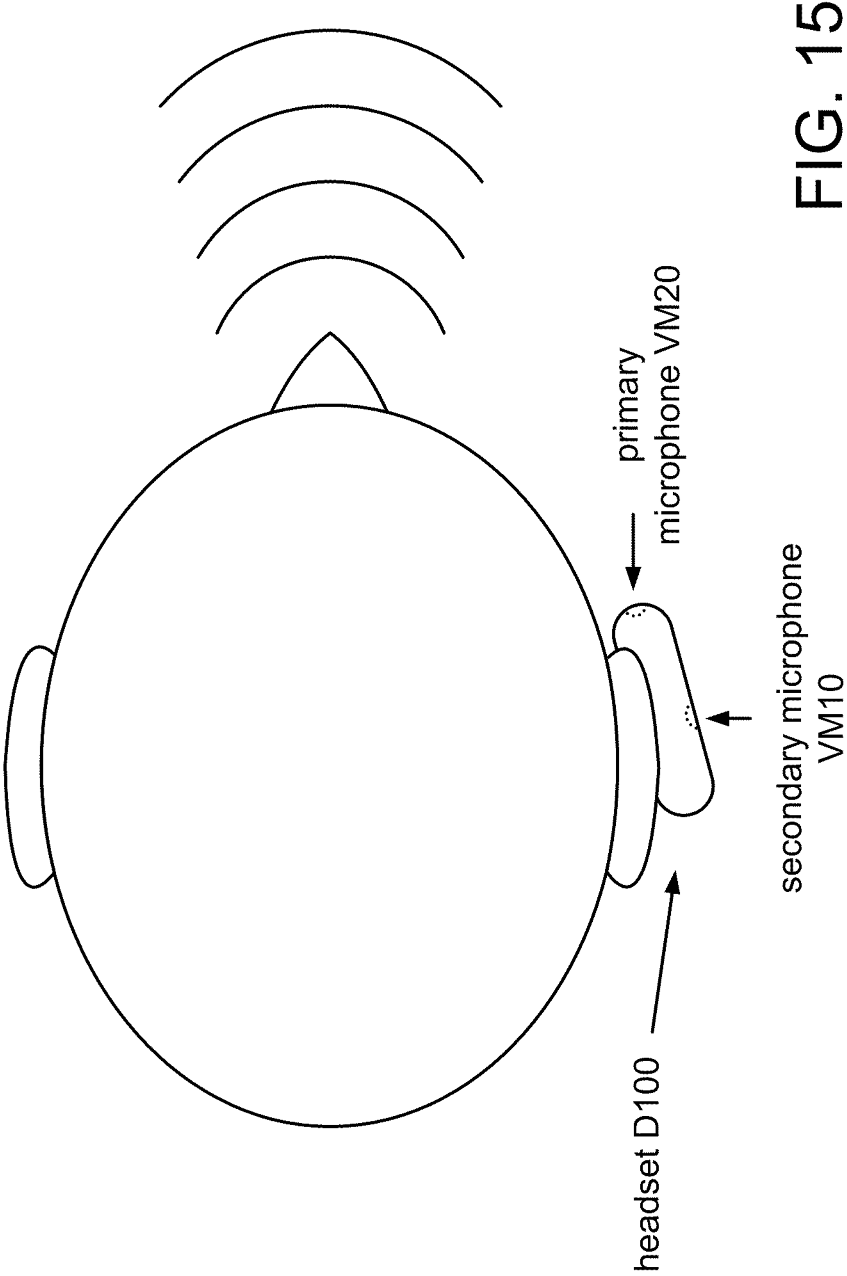
FIG. 15 shows a headset D100 as mounted at a user's ear in a standard operating orientation with respect to the user's mouth.
Figure 16:
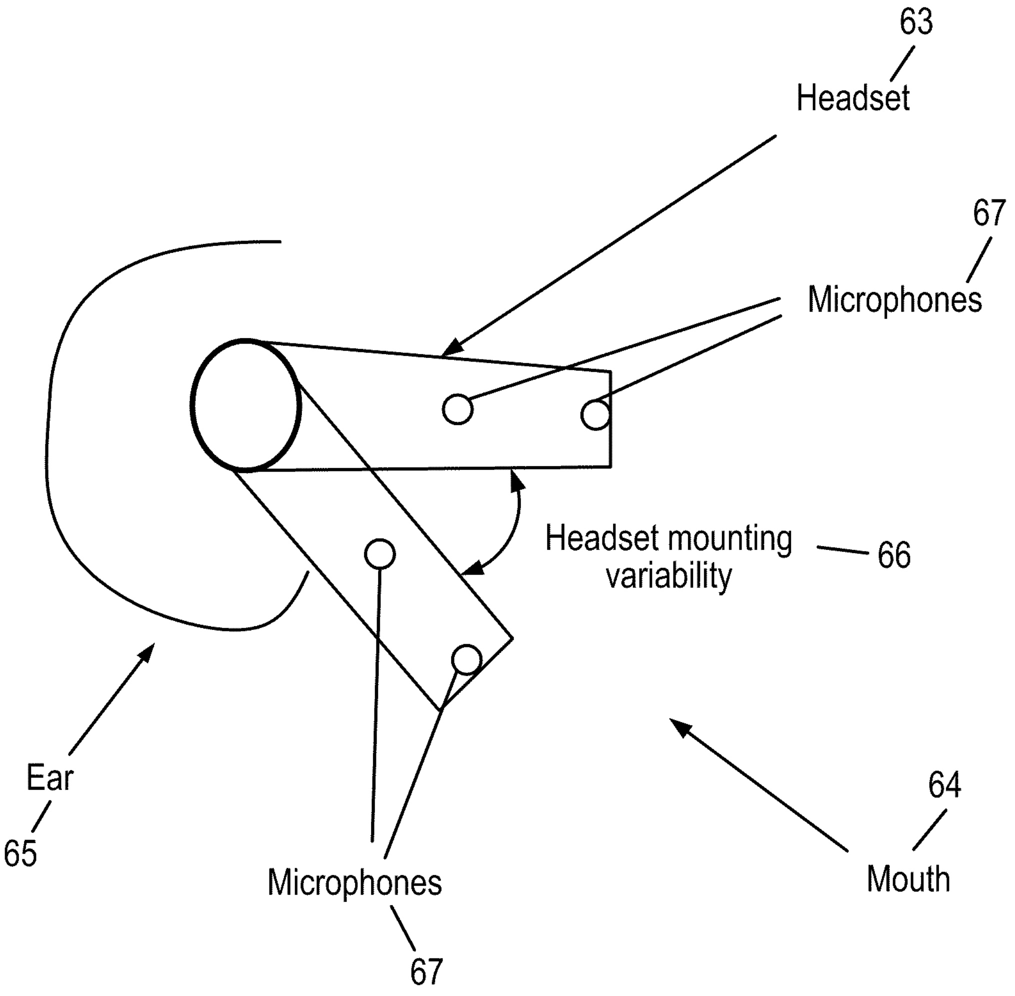
FIG. 16 shows a diagram of a range of different operating configurations of a headset.

FIG. 15 shows headset D100 as mounted at a user's ear in a standard operating orientation with respect to the user's mouth, with microphone VM20 being positioned to receive the user's voice more directly than microphone VM10. FIG. 16 shows a diagram of a range 66 of different operating configurations of a headset 63 (e.g., device D100 or D200) as mounted for use on a user's ear 65. Headset 63 includes an array 67 of primary (e.g., endfire) and secondary (e.g., broadside) microphones that may be oriented differently during use with respect to the user's mouth 64. Such a headset also typically includes a loudspeaker (not shown) which may be disposed at an earplug of the headset. In a further example, a handset that includes the processing elements of an implementation of an ANC apparatus as described herein is configured to receive the microphone signals from a headset having one or more microphones, and to output the loudspeaker signal to the headset, over a wired and/or wireless communications link (e.g., using a version of the Bluetooth™ protocol).

Figure 17A:
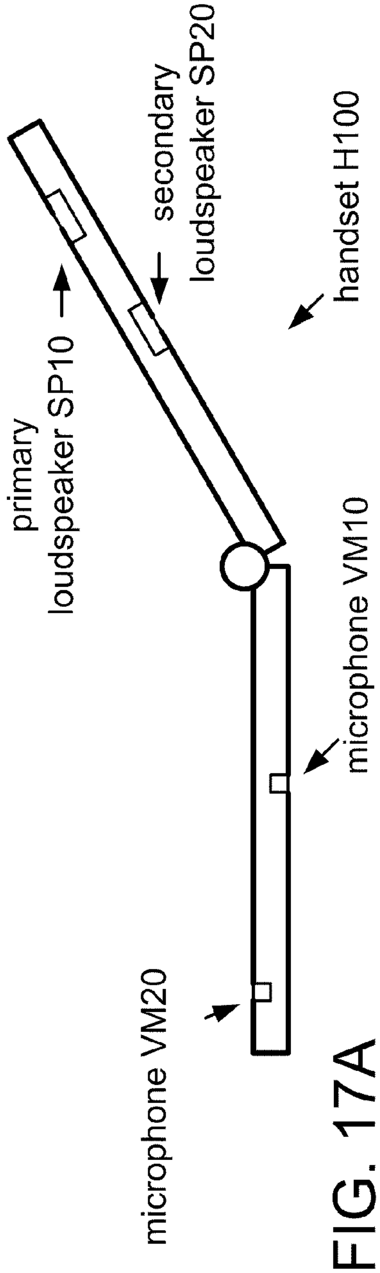
FIG. 17A shows a diagram of a two-microphone handset H100.

FIG. 17A shows a cross-sectional view (along a central axis) of a multi-microphone portable audio sensing device H100 that is a communications handset that may include an implementation of any of the ANC systems described herein. Device H100 includes a two-microphone array having a primary microphone VM20 and a secondary microphone VM10. In this example, device H100 also includes a primary loudspeaker SP10 and a secondary loudspeaker SP20. Such a device may be configured to transmit and receive voice communications data wirelessly via one or more encoding and decoding schemes (also called "codecs"). Examples of such codecs include the Enhanced Variable Rate Codec, as described in the Third Generation Partnership Project 2 (3GPP2) document C.S0014-C, v1.0, entitled "Enhanced Variable Rate Codec, Speech Service Options 3, 68, and 70 for Wideband Spread Spectrum Digital Systems," February 2007 (available online at www-dot-3gpp-dot-org); the Selectable Mode Vocoder speech codec, as described in the 3GPP2 document C.S0030-0, v3.0, entitled "Selectable Mode Vocoder (SMV) Service Option for Wideband Spread Spectrum Communication Systems," January 2004 (available online at www-dot-3gpp-dot-org); the Adaptive Multi Rate (AMR) speech codec, as described in the document ETSI TS 126 092 V6.0.0 (European Telecommunications Standards Institute (ETSI), Sophia Antipolis Cedex, FR, December 2004); and the AMR Wideband speech codec, as described in the document ETSI TS 126 192 V6.0.0 (ETSI, December 2004).

Figure 17B:
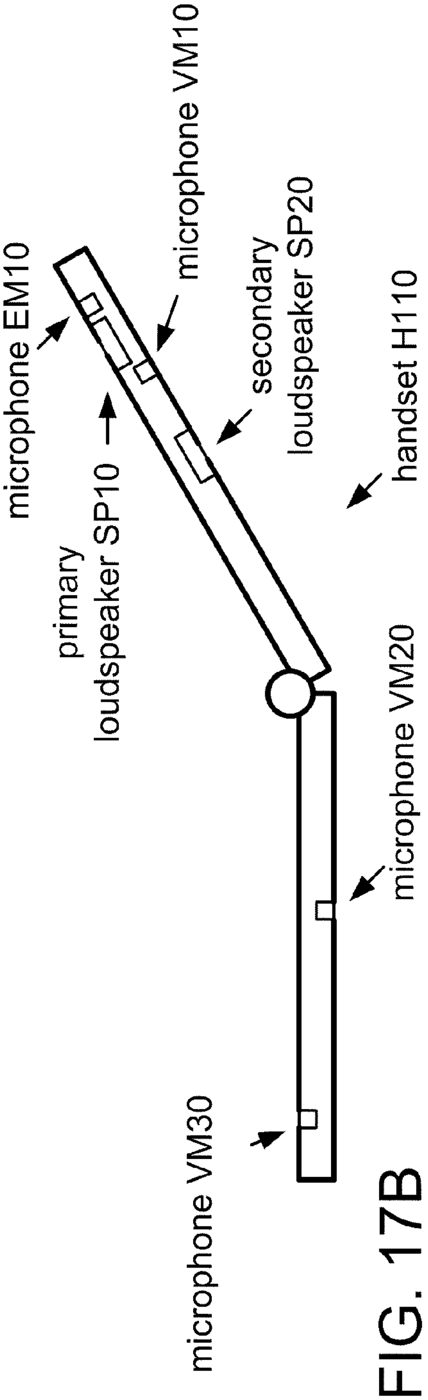
FIG. 17B shows a diagram of an implementation H110 of handset H100.

In the example of FIG. 17A, handset H100 is a clamshell-type cellular telephone handset (also called a "flip" handset). Other configurations of such a multi-microphone communications handset include bar-type and slider-type telephone handsets. Other configurations of such a multi-microphone communications handset may include an array of three, four, or more microphones. FIG. 17B shows a cross-sectional view of an implementation H110 of handset H100 that includes microphone EM10, positioned to pick up an acoustic error feedback signal during a typical use (e.g., as discussed above with reference to FIGS. 9A and 9B), and a microphone VM30 positioned to pick up a user's voice during a typical use. In handset H110, microphone VM10 is positioned to pick up ambient noise during a typical use. Handset H110 may be implemented to include either or both of microphones VM10 and EM10 (e.g., according to the particular ANC method to be performed by the device).

Figure 18:
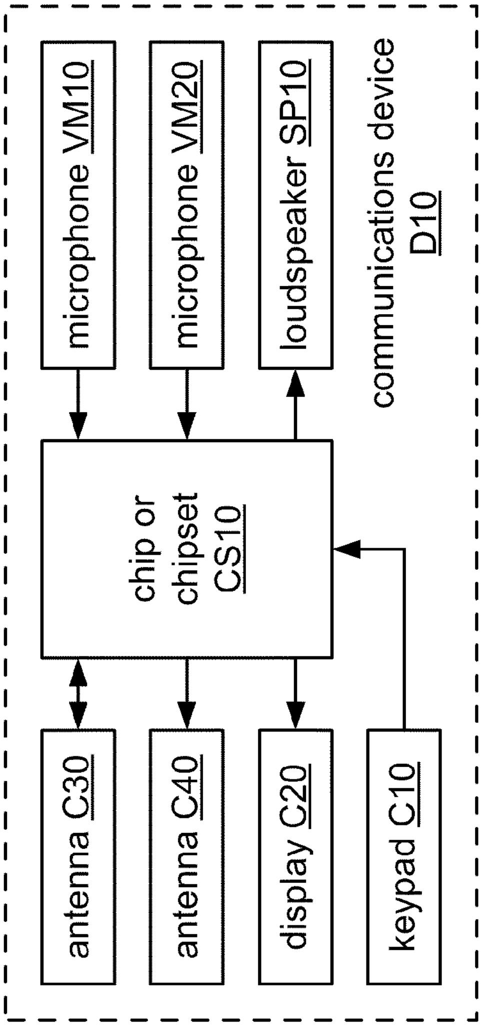
FIG. 18 shows a block diagram of a communications device D10.

Devices such as D100, D200, H100, and H110 may be implemented as instances of a communications device D10 as shown in FIG. 18. Device D10 includes a chip or chipset CS10 (e.g., a mobile station modem (MSM) chipset) that includes one or more processors configured to execute an instance of an ANC apparatus as described herein (e.g., apparatus A100, A110, A120, A200, A210, A220, A300, A310, A320, A400, A420, A500, A510, A520, A530, G100, G200, G300, or G400). Chip or chipset CS10 also includes a receiver configured to receive a radio-frequency (RF) communications signal and to decode and reproduce an audio signal encoded within the RF signal as a far-end communications signal, and a transmitter configured to encode a near-end communications signal based on audio signals from one or more of microphones VM10 and VM20 and to transmit an RF communications signal that describes the encoded audio signal. Device D10 is configured to receive and transmit the RF communications signals via an antenna C30. Device D10 may also include a diplexer and one or more power amplifiers in the path to antenna C30. Chip/chipset CS10 is also configured to receive user input via keypad C10 and to display information via display C20. In this example, device D10 also includes one or more antennas C40 to support Global Positioning System (GPS) location services and/or short-range communications with an external device such as a wireless (e.g., Bluetooth™) headset. In another example, such a communications device is itself a Bluetooth™ headset and lacks keypad C10, display C20, and antenna C30.

It may be desirable to configure source separation module SS10 to calculate a noise estimate based on frames (e.g., 5-, 10-, or 20-millisecond blocks, which may be overlapping or nonoverlapping) of the environmental noise signal that do not contain voice activity. For example, such an implementation of source separation module SS10 may be configured to calculate the noise estimate by time-averaging inactive frames of the environmental noise signal. Such an implementation of source separation module SS10 may include a voice activity detector (VAD) that is configured to classify a frame of the environmental noise signal as active (e.g., speech) or inactive (e.g., noise) based on one or more factors such as frame energy, signal-to-noise ratio, periodicity, autocorrelation of speech and/or residual (e.g., linear prediction coding residual), zero crossing rate, and/or first reflection coefficient. Such classification may include comparing a value or magnitude of such a factor to a threshold value and/or comparing the magnitude of a change in such a factor to a threshold value.

The VAD may be configured to produce an update control signal whose state indicates whether speech activity is currently detected on the environmental noise signal. Such an implementation of source separation module SS10 may be configured to suspend updates of the noise estimate when the VAD V10 indicates that the current frame of the environmental noise signal is active, and possibly to obtain voice signal V10 by subtracting the noise estimate from the environmental noise signal (e.g., by performing a spectral subtraction operation).

The VAD may be configured to classify a frame of the environmental noise signal as active or inactive (e.g., to control a binary state of the update control signal) based on one or more factors such as frame energy, signal-to-noise ratio (SNR), periodicity, zero-crossing rate, autocorrelation of speech and/or residual, and first reflection coefficient. Such classification may include comparing a value or magnitude of such a factor to a threshold value and/or comparing the magnitude of a change in such a factor to a threshold value. Alternatively or additionally, such classification may include comparing a value or magnitude of such a factor, such as energy, or the magnitude of a change in such a factor, in one frequency band to a like value in another frequency band. It may be desirable to implement the VAD to perform voice activity detection based on multiple criteria (e.g., energy, zero-crossing rate, etc.) and/or a memory of recent VAD decisions. One example of a voice activity detection operation that may be performed by the VAD includes comparing highband and lowband energies of reproduced audio signal S40 to respective thresholds as described, for example, in section 4.7 (pp. 4-49 to 4-57) of the 3GPP2 document C.S0014-C, v1.0, entitled "Enhanced Variable Rate Codec, Speech Service Options 3, 68, and 70 for Wideband Spread Spectrum Digital Systems," January 2007 (available online at www-dot-3gpp-dot-org). Such a VAD is typically configured to produce an update control signal that is a binary-valued voice detection indication signal, but configurations that produce a continuous and/or multi-valued signal are also possible.

Figure 20:
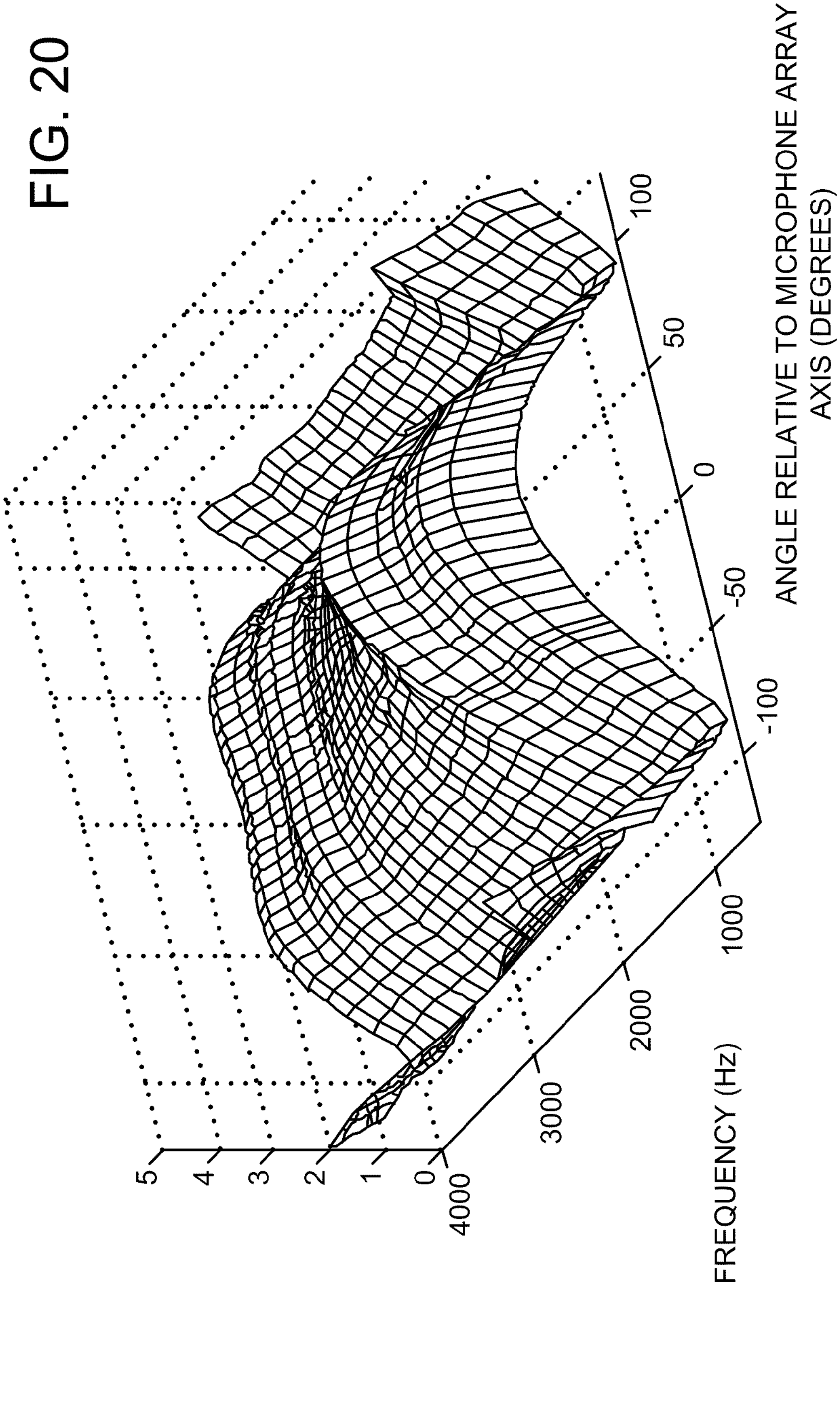
FIG. 20 shows a beam pattern for one example of source separation filter SS22.

Alternatively, it may be desirable to configure source separation module SS20 to perform a spatially selective processing operation on a multichannel environmental noise signal (i.e., from microphones VM10 and VM20) to produce target component S10 and/or noise component S20. For example, source separation module SS20 may be configured to separate a directional desired component of the multichannel environmental noise signal (e.g., the user's voice) from one or more other components of the signal, such as a directional interfering component and/or a diffuse noise component. In such case, source separation module SS20 may be configured to concentrate energy of the directional desired component so that target component S10 includes more of the energy of the directional desired component than each channel of the multichannel environmental noise signal does (that is to say, so that target component S10 includes more of the energy of the directional desired component than any individual channel of the multichannel environmental noise signal does). FIG. 20 shows a beam pattern for one example of source separation module SS20 that demonstrates the directionality of the filter response with respect to the axis of the microphone array. It may be desirable to implement source separation module SS20 to provide a reliable and contemporaneous estimate of the environmental noise that includes both stationary and nonstationary noise.

Figure 19:
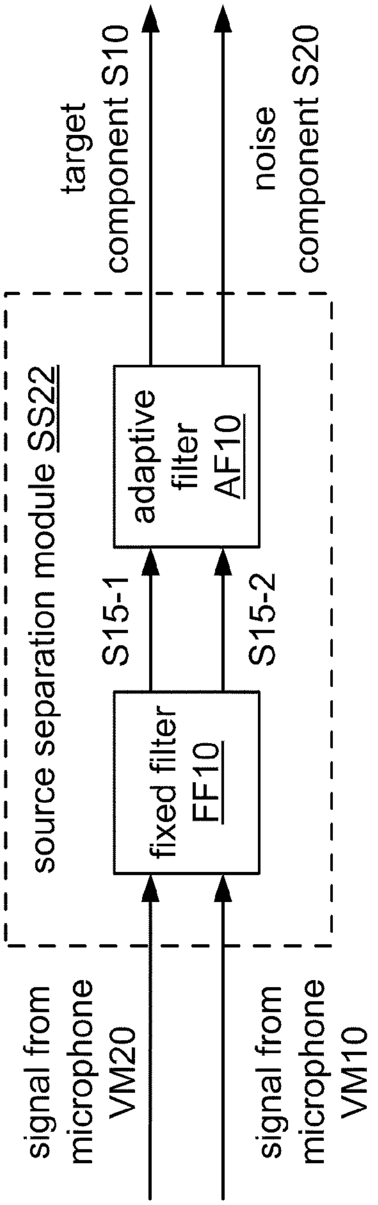
FIG. 19 shows a block diagram of an implementation SS22 of source separation filter SS20.

Source separation module SS20 may be implemented to include a fixed filter FF10 that is characterized by one or more matrices of filter coefficient values. These filter coefficient values may be obtained using a beamforming, blind source separation (BSS), or combined BSS/beamforming method, as described in more detail below. Source separation module SS20 may also be implemented to include more than one stage. FIG. 19 shows a block diagram of such an implementation SS22 of source separation module SS20 that includes a fixed filter stage FF10 and an adaptive filter stage AF10. In this example, fixed filter stage FF10 is arranged to filter channels of the multichannel environmental noise signal to produce filtered channels S15-1 and S15-2, and adaptive filter stage AF10 is arranged to filter the channels S15-1 and S15-2 to produce target component S10 and noise component S20. Adaptive filter stage AF10 may be configured to adapt during a use of the device (e.g., to change the values of one or more of its filter coefficients in response to an event such as, for example, a change in the orientation of the device as shown in FIG. 16).

It may be desirable to use fixed filter stage FF10 to generate initial conditions (e.g., an initial filter state) for adaptive filter stage AF10. It may also be desirable to perform adaptive scaling of the inputs to source separation module SS20 (e.g., to ensure stability of an IIR fixed or adaptive filter bank). The filter coefficient values that characterize source separation module SS20 may be obtained according to an operation to train an adaptive structure of source separation module SS20, which may include feedforward and/or feedback coefficients and may be a finite-impulse-response (FIR) or infinite-impulse-response (IIR) design. Further details of such structures, adaptive scaling, training operations, and initial-conditions generation operations are described, for example, in U.S. patent application Ser. No. 12/197,924, filed Aug. 25, 2008, entitled "SYSTEMS, METHODS, AND APPARATUS FOR SIGNAL SEPARATION."

Source separation module SS20 may be implemented according to a source separation algorithm. The term "source separation algorithm" includes blind source separation (BSS) algorithms, which are methods of separating individual source signals (which may include signals from one or more information sources and one or more interference sources) based only on mixtures of the source signals. Blind source separation algorithms may be used to separate mixed signals that come from multiple independent sources. Because these techniques do not require information on the source of each signal, they are known as "blind source separation" methods. The term "blind" refers to the fact that the reference signal or signal of interest is not available, and such methods commonly include assumptions regarding the statistics of one or more of the information and/or interference signals. In speech applications, for example, the speech signal of interest is commonly assumed to have a supergaussian distribution (e.g., a high kurtosis). The class of BSS algorithms also includes multivariate blind deconvolution algorithms.

A BSS method may include an implementation of independent component analysis. Independent component analysis (ICA) is a technique for separating mixed source signals (components) which are presumably independent from each other. In its simplified form, independent component analysis applies an "un-mixing" matrix of weights to the mixed signals (for example, by multiplying the matrix with the mixed signals) to produce separated signals. The weights may be assigned initial values that are then adjusted to maximize joint entropy of the signals in order to minimize information redundancy. This weight-adjusting and entropy-increasing process is repeated until the information redundancy of the signals is reduced to a minimum. Methods such as ICA provide relatively accurate and flexible means for the separation of speech signals from noise sources. Independent vector analysis (IVA) is a related BSS technique in which the source signal is a vector source signal instead of a single variable source signal.

The class of source separation algorithms also includes variants of BSS algorithms, such as constrained ICA and constrained IVA, which are constrained according to other a priori information, such as a known direction of each of one or more of the source signals with respect to, for example, an axis of the microphone array. Such algorithms may be distinguished from beamformers that apply fixed, non-adaptive solutions based only on directional information and not on observed signals. Examples of such beamformers that may be used to configure other implementations of source separation module SS20 include generalized sidelobe canceller (GSC) techniques, minimum variance distortionless response (MVDR) beamforming techniques, and linearly constrained minimum variance (LCMV) beamforming techniques.

Alternatively or additionally, source separation module SS20 may be configured to distinguish target and noise components according to a measure of directional coherence of a signal component across a range of frequencies. Such a measure may be based on phase differences between corresponding frequency components of different channels of the multichannel audio signal (e.g., as described in U.S. Prov'l Pat. Appl. No. 61/108,447, entitled "Motivation for multi mic phase correlation based masking scheme," filed Oct. 24, 2008 and U.S. Prov'l Pat. Appl. No. 61/185,518, entitled "SYSTEMS, METHODS, APPARATUS, AND COMPUTER-READABLE MEDIA FOR COHERENCE DETECTION," filed Jun. 9, 2009). Such an implementation of source separation module SS20 may be configured to distinguish components that are highly directionally coherent (perhaps within a particular range of directions relative to the microphone array) from other components of the multichannel audio signal, such that the separated target component S10 includes only coherent components.

Alternatively or additionally, source separation module SS20 may be configured to distinguish target and noise components according to a measure of the distance of the source of the component from the microphone array. Such a measure may be based on differences between the energies of different channels of the multichannel audio signal at different times (e.g., as described in U.S. Prov'l Pat. Appl. No. 61/227,037, entitled "SYSTEMS, METHODS, APPARATUS, AND COMPUTER-READABLE MEDIA FOR PHASE-BASED PROCESSING OF MULTICHANNEL SIGNAL," filed Jul. 20, 2009). Such an implementation of source separation module SS20 may be configured to distinguish components whose sources are within a particular distance of the microphone array (i.e., components from near-field sources) from other components of the multichannel audio signal, such that the separated target component S10 includes only near-field components.

It may be desirable to implement source separation module SS20 to include a noise reduction stage that is configured to apply noise component S20 to further reduce noise in target component S10. Such a noise reduction stage may be implemented as a Wiener filter whose filter coefficient values are based on signal and noise power information from target component S10 and noise component S20. In such case, the noise reduction stage may be configured to estimate the noise spectrum based on information from noise component S20. Alternatively, the noise reduction stage may be implemented to perform a spectral subtraction operation on target component S10, based on a spectrum from noise component S20. Alternatively, the noise reduction stage may be implemented as a Kalman filter, with noise covariance being based on information from noise component S20.

Figure 21A:
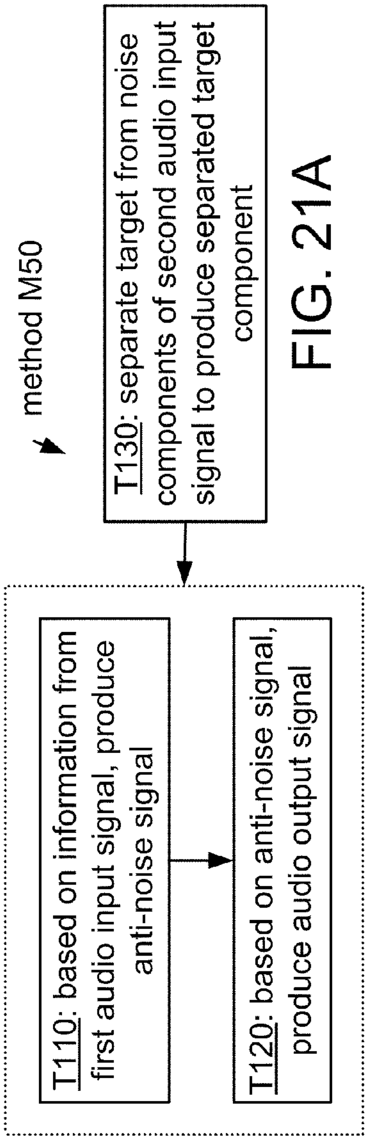
FIG. 21A shows a flowchart of a method M50 according to a general configuration.

FIG. 21A shows a flowchart of a method M50 according to a general configuration that includes tasks T110, T120, and T130. Based on information from a first audio input signal, task T110 produces an anti-noise signal (e.g., as described herein with reference to ANC filter AN10). Based on the anti-noise signal, task T120 produces an audio output signal (e.g., as described herein with reference to audio output stages AO10 and AO20). Task T130 separates a target component of a second audio input signal from a noise component of the second audio input signal to produce a separated target component (e.g., as described herein with reference to source separation module SS10). In this method, the audio output signal is based on the separated target component.

Figure 21B:
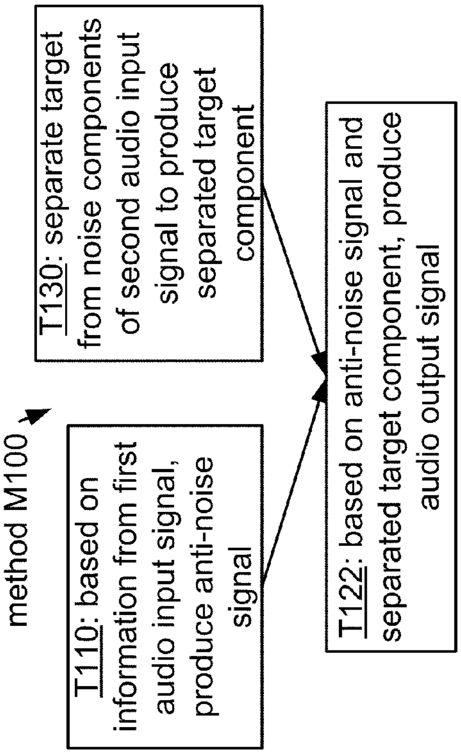
FIG. 21B shows a flowchart of an implementation M100 of method M50.
Figure 27A:
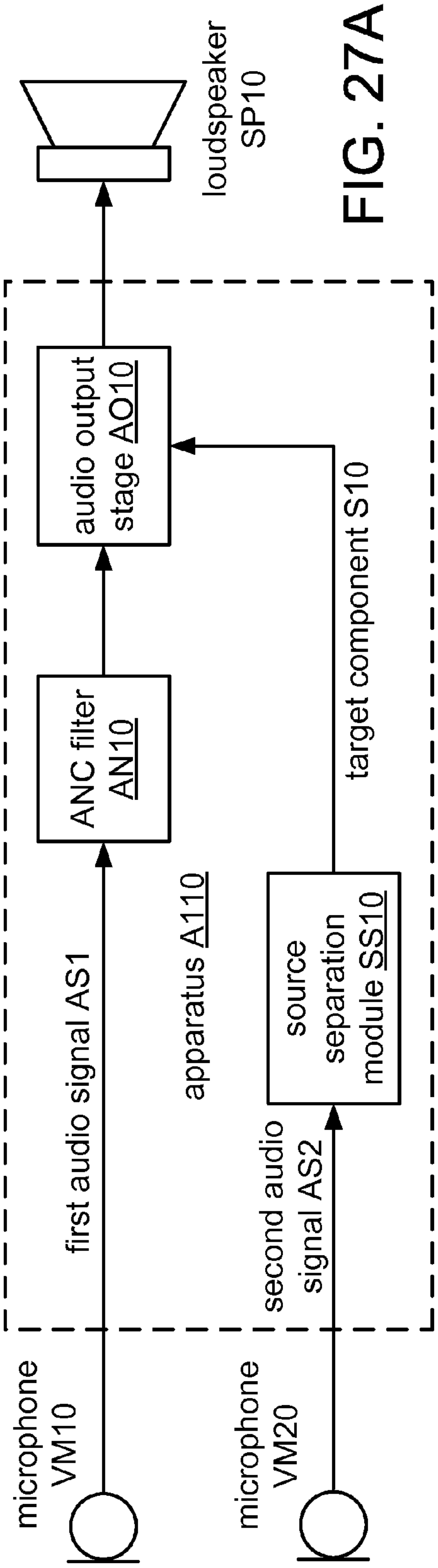
FIGS. 27A and 27B illustrate use of such a method with apparatus A110 and Al20, respectively.
Figure 27B:
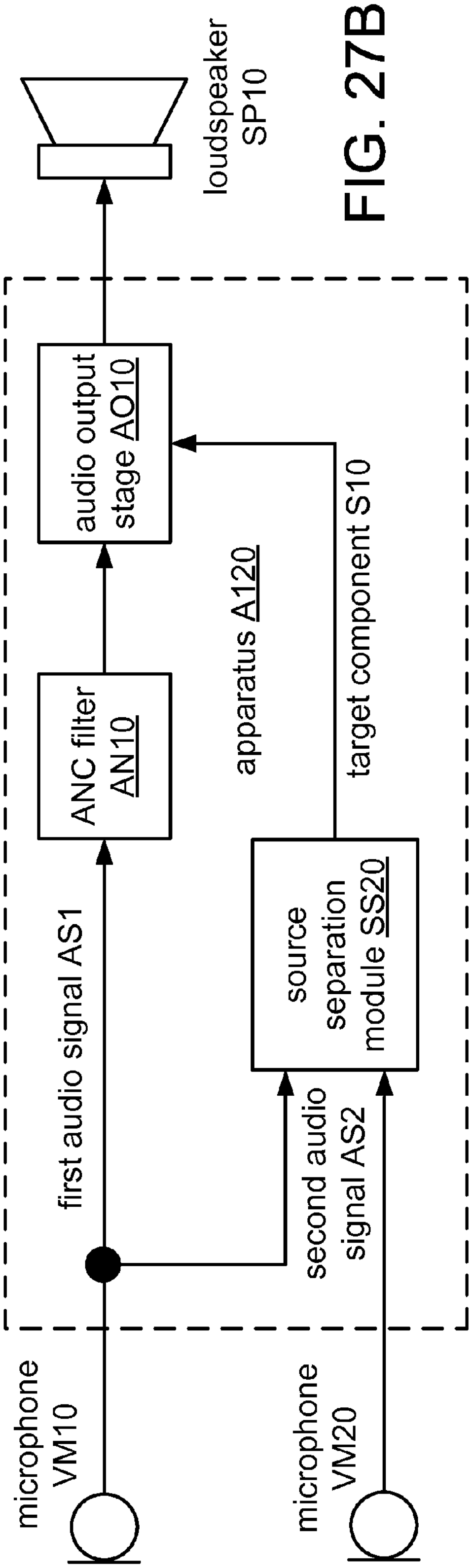
Figure 30A:
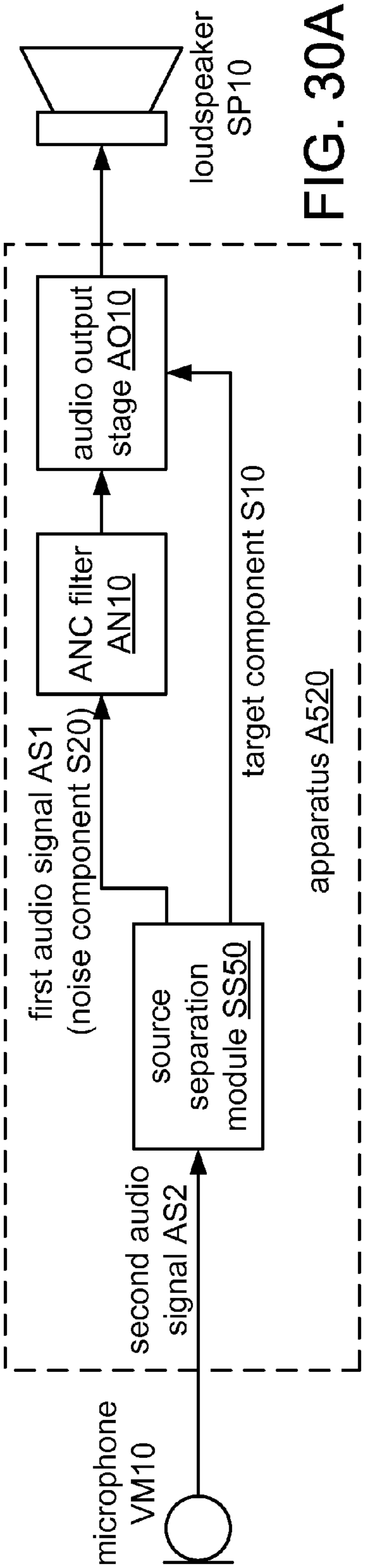
FIG. 30A illustrates use of such an apparatus with method M100.
Figure 30B:
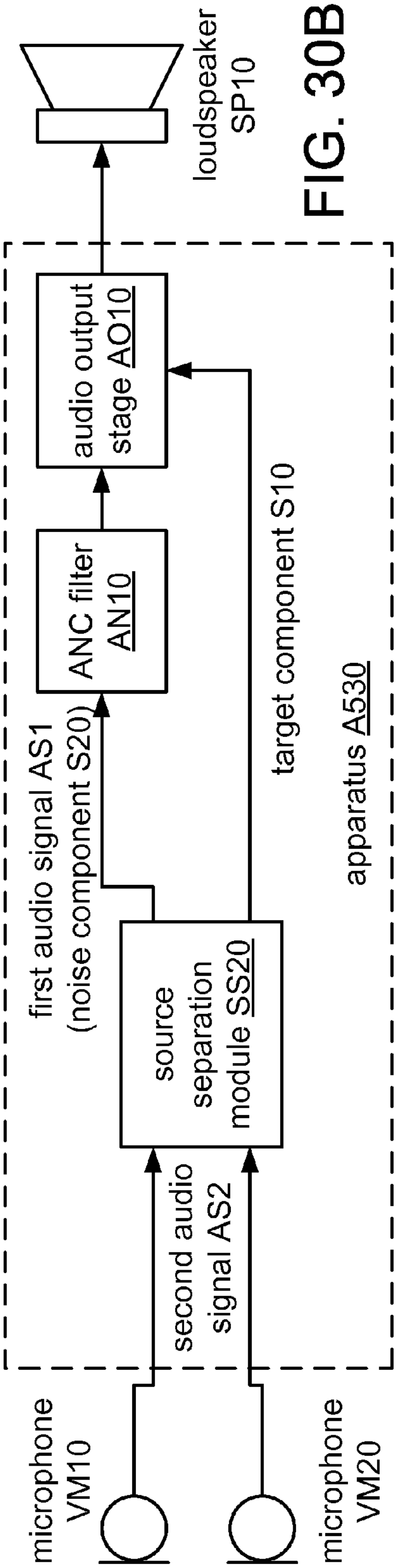
FIG. 30B illustrates use of such an apparatus with method M100.

FIG. 21B shows a flowchart of an implementation M100 of method M50. Method M100 includes an implementation T122 of task T120 that produces the audio output signal based on the anti-noise signal produced by task T110 and the separated target component produced by task T130 (e.g., as described herein with reference to audio output stage A010 and apparatus A100, Al 10, A300, and A400). FIGS. 27A and 27B illustrate use of such a method with apparatus Al 10 and Al20, respectively, as disclosed herein, and FIGS. 30A and 30B illustrate use of such a method with apparatus A520 and A530, respectively, as disclosed herein.

Figure 22A:
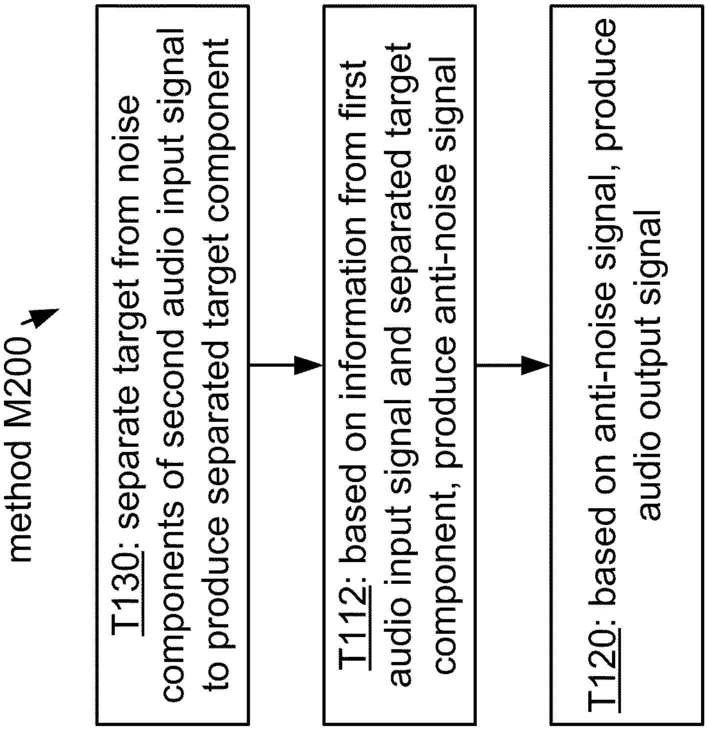
FIG. 22A shows a flowchart of an implementation M200 of method M50.
Figure 28A:
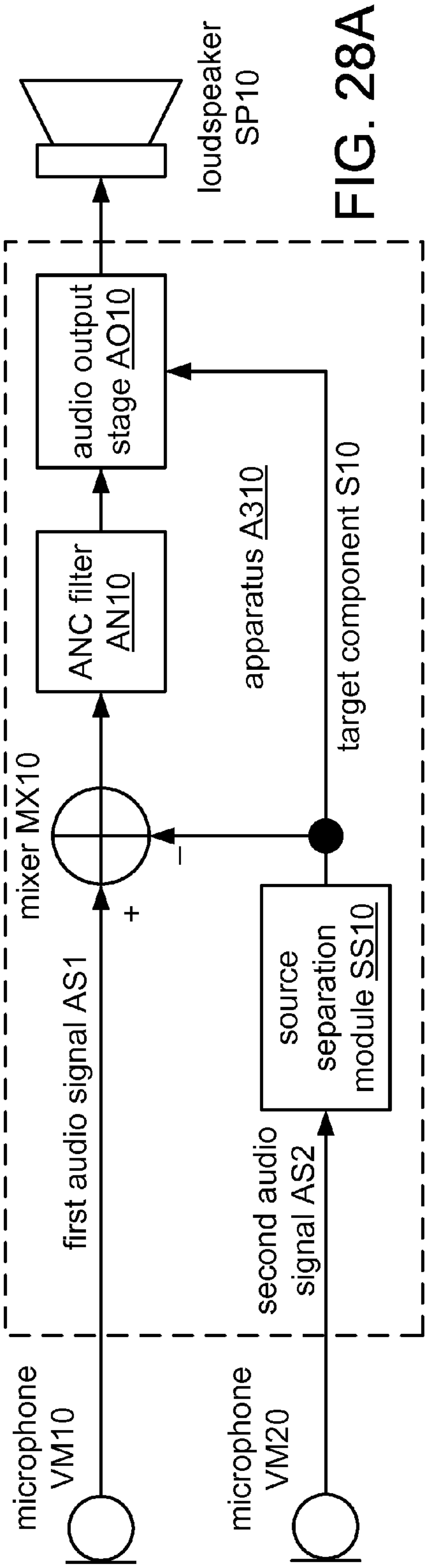
FIGS. 28A and 28B illustrate use of such a method with apparatus A310 and A320, respectively.
Figure 28B:
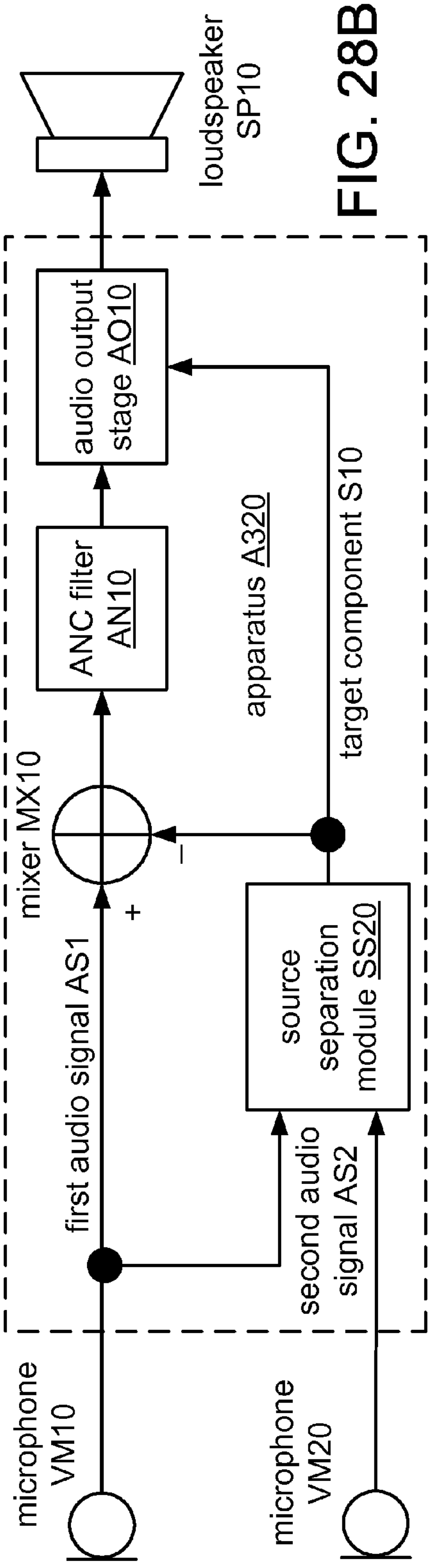

FIG. 22A shows a flowchart of an implementation M200 of method M50. Method M200 includes an implementation T112 of task T110 that produces the anti-noise signal based on information from the first audio input signal and on information from the separated target component produced by task T130 (e.g., as described herein with reference to mixer MX10 and apparatus A200, A210, A300, and A400). FIGS. 28A and 28B illustrate use of such a method with apparatus A310 and A320, respectively, as disclosed herein.

Figure 22B:
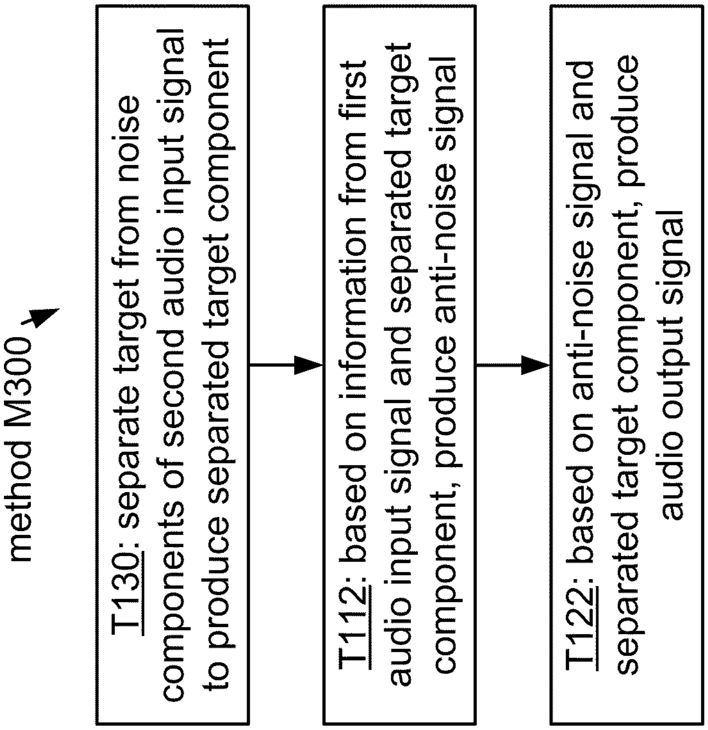
FIG. 22B shows a flowchart of an implementation M300 of method M50 and M200.
Figure 23A:
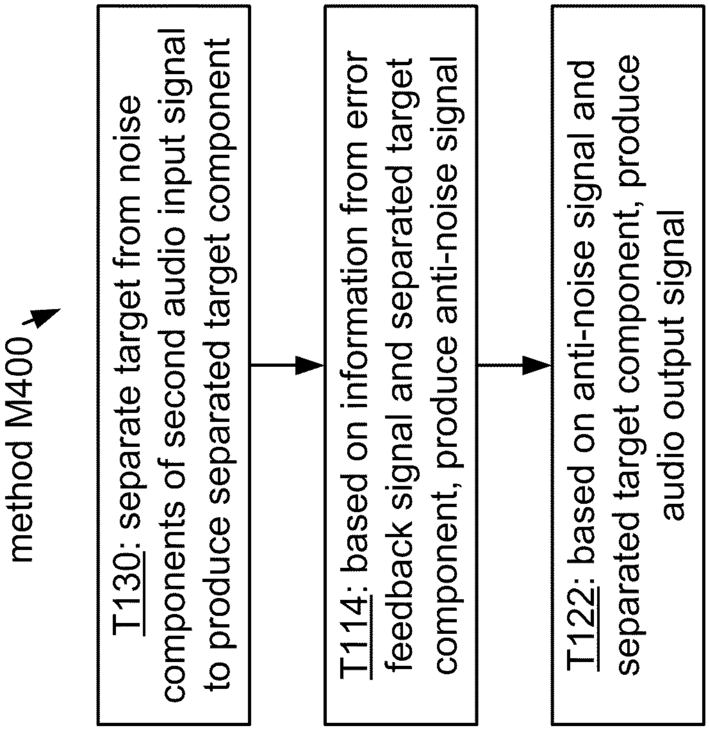
FIG. 23A shows a flowchart of an implementation M400 of method M50, M200, and M300.
Figure 29A:
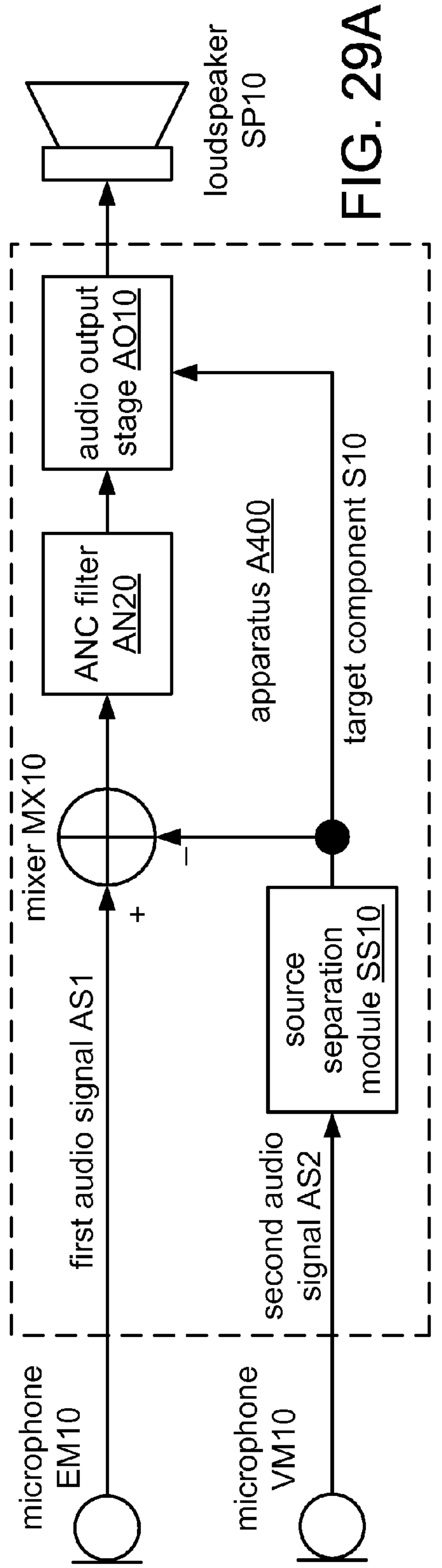
FIGS. 29A and 29B illustrate use of such a method with apparatus A400 and A420, respectively.
Figure 29B:
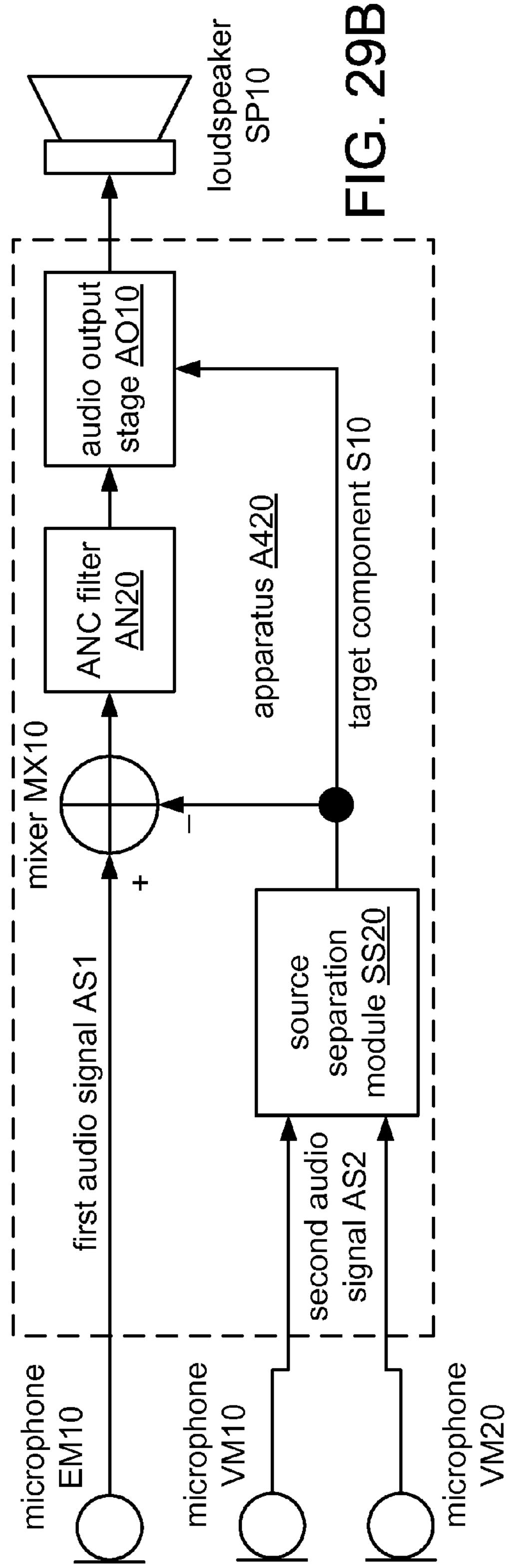

FIG. 22B shows a flowchart of an implementation M300 of method M50 and M200 that includes tasks T130, T112, and T122 (e.g., as described herein with reference to apparatus A300). FIG. 23A shows a flowchart of an implementation M400 of method M50, M200, and M300. Method M400 includes an implementation T114 of task T112 in which the first audio input signal is an error feedback signal (e.g., as described herein with reference to apparatus A400). FIGS. 29A and 29B illustrate use of such a method with apparatus A400 and A420, respectively, as disclosed herein.

Figure 23B:
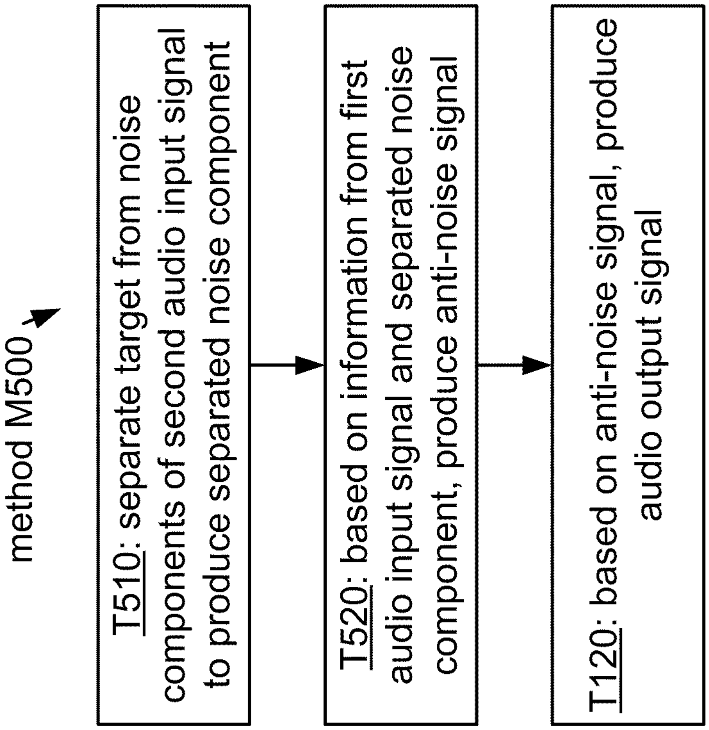
FIG. 23B shows a flowchart of a method M500 according to a general configuration.

FIG. 23B shows a flowchart of a method M500 according to a general configuration that includes tasks T510, T520, and T120. Task T510 separates a target component of a second audio input signal from a noise component of the second audio input signal to produce a separated noise component (e.g., as described herein with reference to source separation module SS30). Task T520 produces an anti-noise signal based on information from a first audio input signal and on information from the separated noise component produced by task T510 (e.g., as described herein with reference to ANC filter AN10). Based on the anti-noise signal, task T120 produces an audio output signal (e.g., as described herein with reference to audio output stages AO10 and AO20).

Figure 24A:
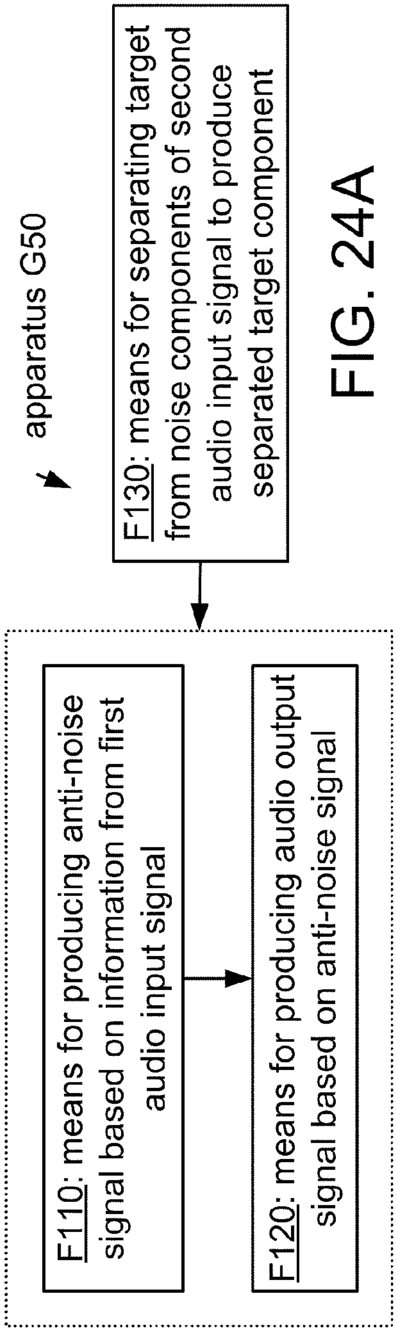
FIG. 24A shows a block diagram of an apparatus G50 according to a general configuration.

FIG. 24A shows a block diagram of an apparatus G50 according to a general configuration. Apparatus G50 includes means F110 for producing an anti-noise signal based on information from a first audio input signal (e.g., as described herein with reference to ANC filter AN10). Apparatus G50 also includes means F120 for producing an audio output signal based on the anti-noise signal (e.g., as described herein with reference to audio output stages AO10 and AO20). Apparatus G50 also includes means F130 for separating a target component of a second audio input signal from a noise component of the second audio input signal to produce a separated target component (e.g., as described herein with reference to source separation module SS10). In this apparatus, the audio output signal is based on the separated target component.

Figure 24B:
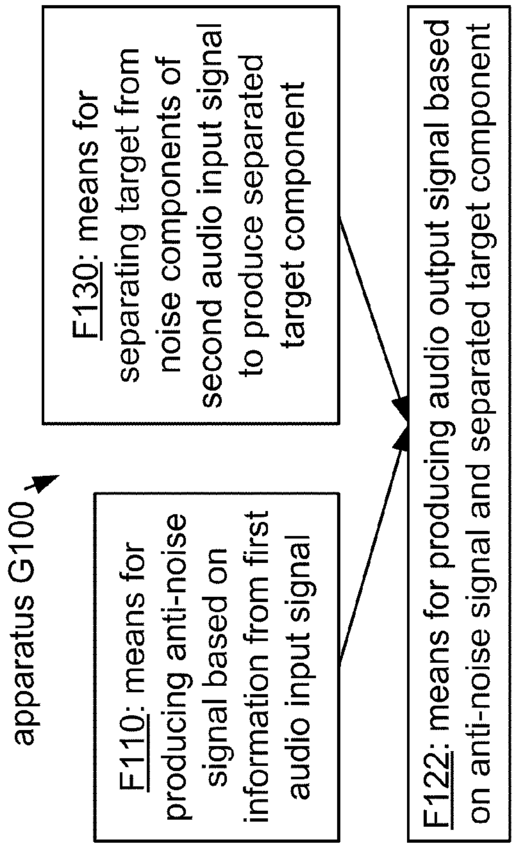
FIG. 24B shows a block diagram of an implementation G100 of apparatus G50.

FIG. 24B shows a block diagram of an implementation G100 of apparatus G50. Apparatus G100 includes an implementation F122 of means F120 that produces the audio output signal based on the anti-noise signal produced by means F110 and the separated target component produced by means F130 (e.g., as described herein with reference to audio output stage AO10 and apparatus A100, A110, A300, and A400).

Figure 25A:
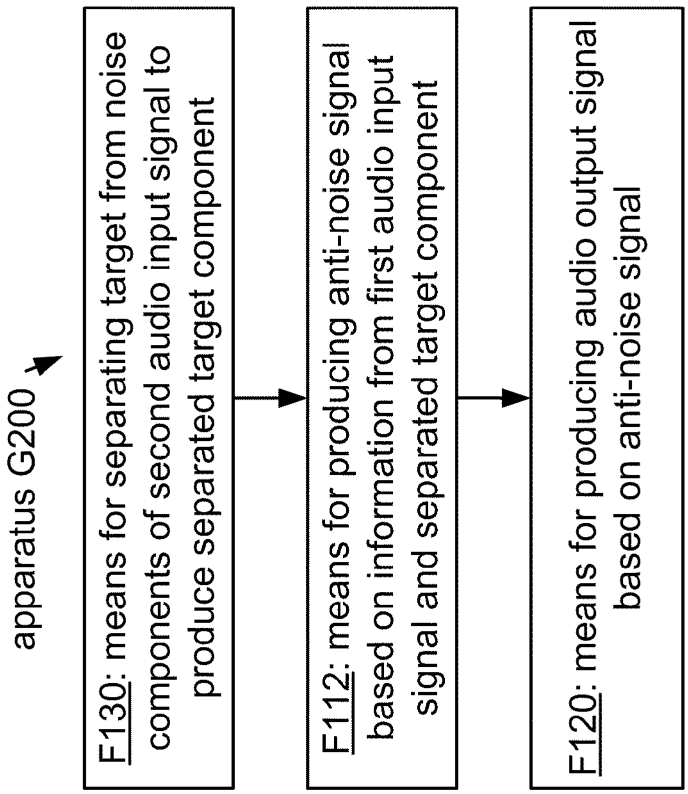
FIG. 25A shows a block diagram of an implementation G200 of apparatus G50.

FIG. 25A shows a block diagram of an implementation G200 of apparatus G50. Apparatus G200 includes an implementation F112 of means F110 that produces the anti-noise signal based on information from the first audio input signal and on information from the separated target component produced by means F130 (e.g., as described herein with reference to mixer MX10 and apparatus A200, A210, A300, and A400).

Figure 25B:
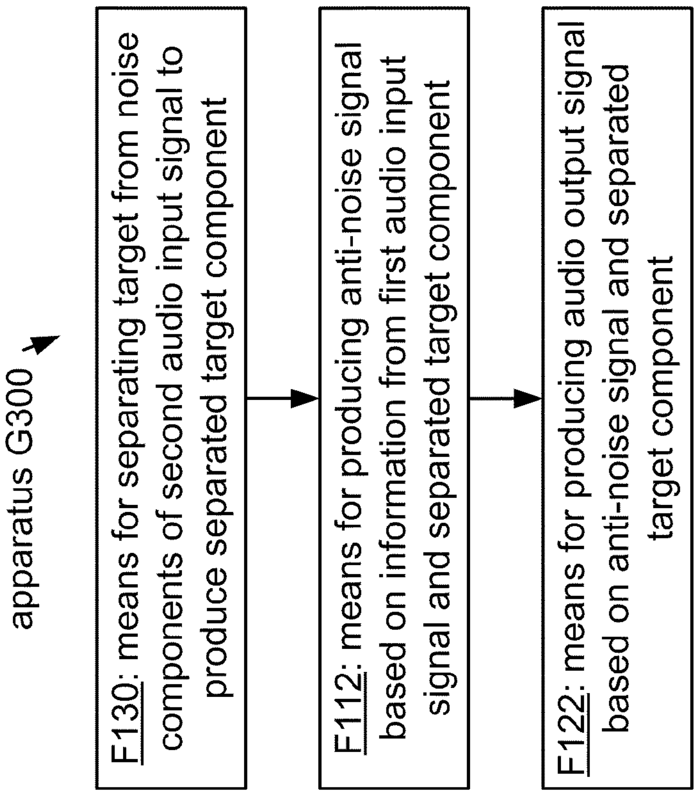
FIG. 25B shows a block diagram of an implementation G300 of apparatus G50 and G200.
Figure 26A:
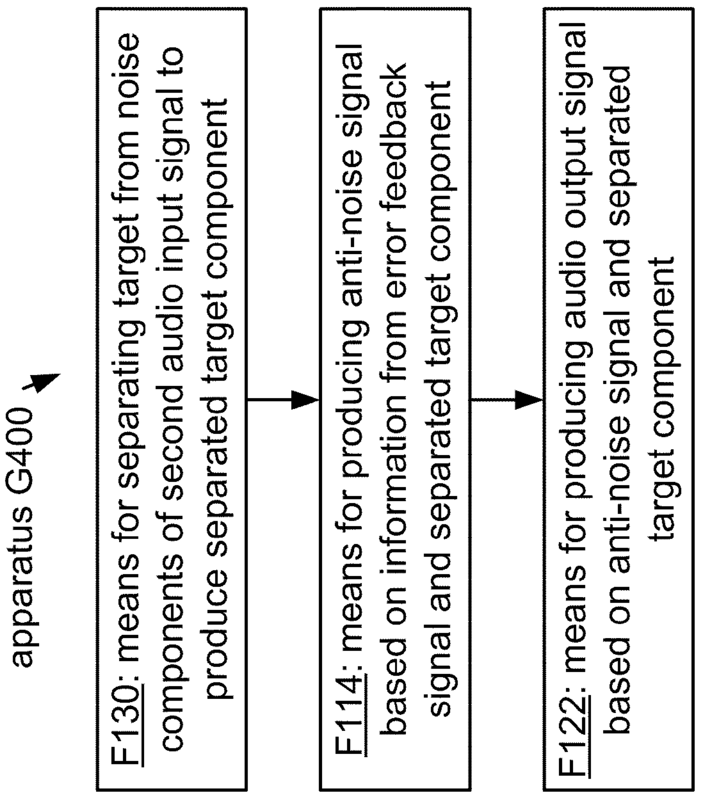
FIG. 26A shows a block diagram of an implementation G400 of apparatus G50, G200, and G300.

FIG. 25B shows a block diagram of an implementation G300 of apparatus G50 and G200 that includes means F130, F112, and F122 (e.g., as described herein with reference to apparatus A300). FIG. 26A shows a block diagram of an implementation G400 of apparatus G50, G200, and G300. Apparatus G400 includes an implementation F114 of means F112 in which the first audio input signal is an error feedback signal (e.g., as described herein with reference to apparatus A400).

Figure 26B:
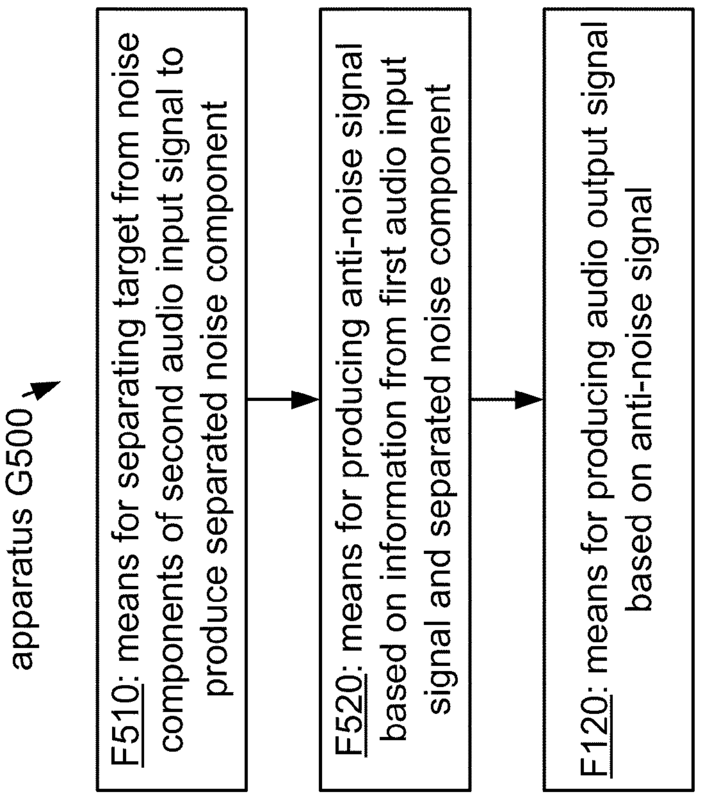
FIG. 26B shows a block diagram of an apparatus G500 according to a general configuration.

FIG. 26B shows a block diagram of an apparatus G500 according to a general configuration that includes means F510 for separating a target component of a second audio input signal from a noise component of the second audio input signal to produce a separated noise component (e.g., as described herein with reference to source separation module SS30). Apparatus G500 also includes means F520 for producing an anti-noise signal based on information from a first audio input signal and on information from the separated noise component produced by means F510 (e.g., as described herein with reference to ANC filter AN10). Apparatus G50 also includes means F120 for producing an audio output signal based on the anti-noise signal (e.g., as described herein with reference to audio output stages AO10 and AO20).

The foregoing presentation of the described configurations is provided to enable any person skilled in the art to make or use the methods and other structures disclosed herein. The flowcharts, block diagrams, state diagrams, and other structures shown and described herein are examples only, and other variants of these structures are also within the scope of the disclosure. Various modifications to these configurations are possible, and the generic principles presented herein may be applied to other configurations as well. Thus, the present disclosure is not intended to be limited to the configurations shown above but rather is to be accorded the widest scope consistent with the principles and novel features disclosed in any fashion herein, including in the attached claims as filed, which form a part of the original disclosure.

Those of skill in the art will understand that information and signals may be represented using any of a variety of different technologies and techniques. For example, data, instructions, commands, information, signals, bits, and symbols that may be referenced throughout the above description may be represented by voltages, currents, electromagnetic waves, magnetic fields or particles, optical fields or particles, or any combination thereof.

Important design requirements for implementation of a configuration as disclosed herein may include minimizing processing delay and/or computational complexity (typically measured in millions of instructions per second or MIPS), especially for computation-intensive applications, such as playback of compressed audio or audiovisual information (e.g., a file or stream encoded according to a compression format, such as one of the examples identified herein) or applications for voice communications at higher sampling rates (e.g., for wideband communications).

The various elements of an implementation of an apparatus as disclosed herein (e.g., the various elements of apparatus A100, A110, A120, A200, A210, A220, A300, A310, A320, A400, A420, A500, A510, A520, A530, G100, G200, G300, and G400) may be embodied in any combination of hardware, software, and/or firmware that is deemed suitable for the intended application. For example, such elements may be fabricated as electronic and/or optical devices residing, for example, on the same chip or among two or more chips in a chipset. One example of such a device is a fixed or programmable array of logic elements, such as transistors or logic gates, and any of these elements may be implemented as one or more such arrays. Any two or more, or even all, of these elements may be implemented within the same array or arrays. Such an array or arrays may be implemented within one or more chips (for example, within a chipset including two or more chips).

One or more elements of the various implementations of the apparatus disclosed herein (e.g., as enumerated above) may also be implemented in whole or in part as one or more sets of instructions arranged to execute on one or more fixed or programmable arrays of logic elements, such as microprocessors, embedded processors, IP cores, digital signal processors, FPGAs (field-programmable gate arrays), ASSPs (application-specific standard products), and ASICs (application-specific integrated circuits). Any of the various elements of an implementation of an apparatus as disclosed herein may also be embodied as one or more computers (e.g., machines including one or more arrays programmed to execute one or more sets or sequences of instructions, also called "processors"), and any two or more, or even all, of these elements may be implemented within the same such computer or computers.

Those of skill will appreciate that the various illustrative modules, logical blocks, circuits, and operations described in connection with the configurations disclosed herein may be implemented as electronic hardware, computer software, or combinations of both. Such modules, logical blocks, circuits, and operations may be implemented or performed with a general purpose processor, a digital signal processor (DSP), an ASIC or ASSP, an FPGA or other programmable logic device, discrete gate or transistor logic, discrete hardware components, or any combination thereof designed to produce the configuration as disclosed herein. For example, such a configuration may be implemented at least in part as a hard-wired circuit, as a circuit configuration fabricated into an application-specific integrated circuit, or as a firmware program loaded into non-volatile storage or a software program loaded from or into a data storage medium as machine-readable code, such code being instructions executable by an array of logic elements such as a general purpose processor or other digital signal processing unit. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. A software module may reside in a non-transitory computer-readable medium, such as RAM (random-access memory), ROM (read-only memory), nonvolatile RAM (NVRAM) such as flash RAM, erasable programmable ROM (EPROM), electrically erasable programmable ROM (EEPROM), registers, hard disk, a removable disk, or a CD-ROM; or in any other form of storage medium known in the art. An illustrative storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

It is noted that the various methods disclosed herein (e.g., methods M100, M200, M300, M400, and M500, as well as other methods disclosed by virtue of the descriptions of the operation of the various implementations of apparatus as disclosed herein) may be performed by a array of logic elements such as a processor, and that the various elements of an apparatus as described herein may be implemented as modules designed to execute on such an array. As used herein, the term "module" or "sub-module" can refer to any method, apparatus, device, unit or computer-readable data storage medium that includes computer instructions (e.g., logical expressions) in software, hardware or firmware form. It is to be understood that multiple modules or systems can be combined into one module or system and one module or system can be separated into multiple modules or systems to perform the same functions. When implemented in software or other computer-executable instructions, the elements of a process are essentially the code segments to perform the related tasks, such as with routines, programs, objects, components, data structures, and the like. The term "software" should be understood to include source code, assembly language code, machine code, binary code, firmware, macrocode, microcode, any one or more sets or sequences of instructions executable by an array of logic elements, and any combination of such examples. The program or code segments can be stored in a processor readable medium or transmitted by a computer data signal embodied in a carrier wave over a transmission medium or communication link.

The implementations of methods, schemes, and techniques disclosed herein may also be tangibly embodied (for example, in one or more computer-readable media as listed herein) as one or more sets of instructions readable and/or executable by a machine including an array of logic elements (e.g., a processor, microprocessor, microcontroller, or other finite state machine). The term "computer-readable medium" may include any medium that can store or transfer information, including volatile, nonvolatile, removable and non-removable media. Examples of a computer-readable medium include an electronic circuit, a semiconductor memory device, a ROM, a flash memory, an erasable ROM (EROM), a floppy diskette or other magnetic storage, a CD-ROM/DVD or other optical storage, a hard disk, a fiber optic medium, a radio frequency (RF) link, or any other medium which can be used to store the desired information and which can be accessed. The computer data signal may include any signal that can propagate over a transmission medium such as electronic network channels, optical fibers, air, electromagnetic, RF links, etc. The code segments may be downloaded via computer networks such as the Internet or an intranet. In any case, the scope of the present disclosure should not be construed as limited by such embodiments.

Each of the tasks of the methods described herein may be embodied directly in hardware, in a software module executed by a processor, or in a combination of the two. In a typical application of an implementation of a method as disclosed herein, an array of logic elements (e.g., logic gates) is configured to perform one, more than one, or even all of the various tasks of the method. One or more (possibly all) of the tasks may also be implemented as code (e.g., one or more sets of instructions), embodied in a computer program product (e.g., one or more data storage media such as disks, flash or other nonvolatile memory cards, semiconductor memory chips, etc.), that is readable and/or executable by a machine (e.g., a computer) including an array of logic elements (e.g., a processor, microprocessor, microcontroller, or other finite state machine). The tasks of an implementation of a method as disclosed herein may also be performed by more than one such array or machine. In these or other implementations, the tasks may be performed within a device for wireless communications such as a cellular telephone or other device having such communications capability. Such a device may be configured to communicate with circuit-switched and/or packet-switched networks (e.g., using one or more protocols such as VoIP). For example, such a device may include RF circuitry configured to receive and/or transmit encoded frames.

It is expressly disclosed that the various operations disclosed herein may be performed by a portable communications device such as a handset, headset, or portable digital assistant (PDA), and that the various apparatus described herein may be included with such a device. A typical real-time (e.g., online) application is a telephone conversation conducted using such a mobile device.

In one or more exemplary embodiments, the operations described herein may be implemented in hardware, software, firmware, or any combination thereof. If implemented in software, such operations may be stored on or transmitted over a computer-readable medium as one or more instructions or code. The term "computer-readable media" includes both computer storage media and communication media, including any medium that facilitates transfer of a computer program from one place to another. A storage media may be any available media that can be accessed by a computer. By way of example, and not limitation, such computer-readable media can comprise an array of storage elements, such as semiconductor memory (which may include without limitation dynamic or static RAM, ROM, EEPROM, and/or flash RAM), or ferroelectric, magnetoresistive, ovonic, polymeric, or phase-change memory; CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technology such as infrared, radio, and/or microwave, then the coaxial cable, fiber optic cable, twisted pair, DSL, or wireless technology such as infrared, radio, and/or microwave are included in the definition of medium. Disk and disc, as used herein, includes compact disc (CD), laser disc, optical disc, digital versatile disc (DVD), floppy disk and Blu-ray Disc™ (Blu-Ray Disc Association, Universal City, Calif.), where disks usually reproduce data magnetically, while discs reproduce data optically with lasers. Combinations of the above should also be included within the scope of computer-readable media.

An acoustic signal processing apparatus as described herein may be incorporated into an electronic device that accepts speech input in order to control certain operations, or may otherwise benefit from separation of desired noises from background noises, such as communications devices. Many applications may benefit from enhancing or separating clear desired sound from background sounds originating from multiple directions. Such applications may include human-machine interfaces in electronic or computing devices which incorporate capabilities such as voice recognition and detection, speech enhancement and separation, voice-activated control, and the like. It may be desirable to implement such an acoustic signal processing apparatus to be suitable in devices that only provide limited processing capabilities.

The elements of the various implementations of the modules, elements, and devices described herein may be fabricated as electronic and/or optical devices residing, for example, on the same chip or among two or more chips in a chipset. One example of such a device is a fixed or programmable array of logic elements, such as transistors or gates. One or more elements of the various implementations of the apparatus described herein may also be implemented in whole or in part as one or more sets of instructions arranged to execute on one or more fixed or programmable arrays of logic elements such as microprocessors, embedded processors, IP cores, digital signal processors, FPGAs, ASSPs, and ASICs.

It is possible for one or more elements of an implementation of an apparatus as described herein to be used to perform tasks or execute other sets of instructions that are not directly related to an operation of the apparatus, such as a task relating to another operation of a device or system in which the apparatus is embedded. It is also possible for one or more elements of an implementation of such an apparatus to have structure in common (e.g., a processor used to execute portions of code corresponding to different elements at different times, a set of instructions executed to perform tasks corresponding to different elements at different times, or an arrangement of electronic and/or optical devices performing operations for different elements at different times).

What is claimed is:

1. A method of audio signal processing, said method comprising performing each of the following acts using a device configured to process audio signals:

based on information from a first audio signal, producing an anti-noise signal;

separating a target component of a second audio signal from a noise component of the second audio signal to produce a separated target component; and based on a result of mixing the anti-noise signal and the separated target component, producing an audio output signal, wherein the second audio signal includes (A) a first channel that is based on a signal produced by a first microphone and (B) a second channel that is based on a signal produced by a second microphone that is arranged to receive a user's voice more directly than the first microphone, wherein said separating includes performing a spatially selective processing operation on the second audio signal to produce the separated target component.

2. The method of audio signal processing according to claim 1, wherein the first audio signal is based on a signal produced by an error feedback microphone, and wherein said producing the anti-noise signal comprises filtering said first audio signal.

3. The method of audio signal processing according to claim 1, wherein said first channel of the second audio signal is the first audio signal.

4. The method of audio signal processing according to claim 1, wherein said separated target component is a separated voice component, and wherein said separating a target component comprises separating a voice component of the second audio input signal from a noise component of the second audio input signal to produce the separated voice component.

5. The method of audio signal processing according to claim 4, wherein said voice component of the second audio signal includes the user's voice.

6. The method of audio signal processing according to claim 1, wherein the anti-noise signal is based on the separated target component.

7. The method of audio signal processing according to claim 1, wherein said method comprises subtracting the separated target component from the first audio signal to produce a third audio signal, and wherein said anti-noise signal is based on the third audio signal.

8. The method of audio signal processing according to claim 7, wherein the first audio signal is an error feedback signal.

9. The method of audio signal processing according to claim 1, wherein said separating comprises separating said target component from said noise component to produce a separated noise component, and wherein the first audio signal includes the separated noise component produced by said separating.

10. The method of audio signal processing according to claim 1, wherein said method comprises mixing the audio output signal with a far-end communications signal.

11. The method of audio signal processing according to claim 1, wherein said separated target component is a combination of energy from the first channel and energy from the second channel.

12. The method of audio signal processing according to claim 1, wherein said spatially selective processing operation includes calculating, for each of a plurality of different frequency components of the second audio signal, a difference between a phase of the frequency component in the first channel and a phase of the frequency component in the second channel.

13. The method of audio signal processing according to claim 1, wherein said producing the anti-noise signal comprises filtering a signal that includes energy from the first audio signal to produce the anti-noise signal.

14. The method of audio signal processing according to claim 13, wherein said method comprises attenuating a desired sound component in the first audio signal, relative to a noise component of the first audio signal, to produce a third audio signal, and wherein said signal that includes energy from the first audio signal is based on the third audio signal.

15. The method of audio signal processing according to claim 14, wherein said attenuating comprises subtracting the separated target component from the first audio signal to produce the third audio signal.

16. The method of audio signal processing according to claim 14, wherein said separating comprises separating said target component from said noise component to produce a separated noise component, and wherein said attenuating the desired sound component is performed by said separating said target component from said noise component to produce the separated noise component, and wherein said first channel of the second audio signal is the first audio signal, and wherein the third audio signal includes the separated noise component produced by said separating.

17. The method of audio signal processing according to claim 1, wherein said producing the anti-noise signal comprises reversing a phase of a signal that is based on the first audio signal to produce the anti-noise signal.

18. A non-transitory computer-readable medium comprising instructions which when executed by at least one processor cause the at least one processor to perform a method of audio signal processing, said instructions comprising:

instructions which when executed by the at least one processor cause the at least one processor to produce an anti-noise signal based on information from a first audio signal;

instructions which when executed by the at least one processor cause the at least one processor to separate a target component of a second audio signal from a noise component of the second audio signal to produce a separated target component; and instructions which when executed by the at least one processor cause the at least one processor to produce an audio output signal based on a result of mixing the anti-noise signal and the separated target component, wherein the second audio signal includes (A) a first channel that is based on a signal produced by a first microphone and (B) a second channel that is based on a signal produced by a second microphone that is arranged to receive a user's voice more directly than the first microphone, wherein said instructions which when executed by the at least one processor cause the at least one processor to separate include instructions which when executed by the at least one processor cause the at least one processor to perform a spatially selective processing operation on the second audio signal to produce the separated target component.

19. The computer-readable medium according to claim 18, wherein the first audio signal is based on a signal produced by an error feedback microphone, and wherein said producing the anti-noise signal comprises filtering said first audio signal.

20. The computer-readable medium according to claim 18, wherein said first channel of the second audio signal is the first audio signal.

21. The computer-readable medium according to claim 18, wherein said separated target component is a separated voice component, and wherein said instructions which when executed by the at least one processor cause the at least one processor to separate a target component include instructions which when executed by the at least one processor cause the at least one processor to separate a voice component of the second audio input signal from a noise component of the second audio input signal to produce the separated voice component.

22. The computer-readable medium according to claim 18, wherein the anti-noise signal is based on the separated target component.

23. The computer-readable medium according to claim 18, wherein said medium includes instructions which when executed by the at least one processor cause the at least one processor to attenuate a desired sound component in the first audio signal, relative to a noise component of the first audio signal, to produce a third audio signal, and wherein said producing the anti-noise signal comprises filtering a signal that includes energy from the third audio signal to produce the anti-noise signal.

24. The computer-readable medium according to claim 23, wherein said attenuating the desired sound component comprises subtracting the separated target component from the first audio signal.

25. The computer-readable medium according to claim 24, wherein the first audio signal is an error feedback signal.

26. The computer-readable medium according to claim 23, wherein said instructions which when executed by the at least one processor cause the processor to separate include said instructions which when executed by the at least one processor cause the at least one processor to attenuate the desired sound component to produce the third audio signal, and wherein said instructions which when executed by the at least one processor cause the at least one processor to separate cause the at least one processor to attenuate the desired sound component in the first audio signal by separating said target component from said noise component to produce a separated noise component, and wherein said first channel of the second audio signal is the first audio signal, and wherein the third audio signal includes the separated noise component produced by the processor.

27. The computer-readable medium according to claim 18, wherein said medium includes instructions which when executed by the at least one processor cause the at least one processor to mix the audio output signal with a far-end communications signal.

28. The computer-readable medium according to claim 18, wherein said separated target component is a combination of energy from the first channel and energy from the second channel.

29. The computer-readable medium according to claim 18, wherein said spatially selective processing operation includes calculating, for each of a plurality of different frequency components of the second audio signal, a difference between a phase of the frequency component in the first channel and a phase of the frequency component in the second channel.

30. An apparatus for audio signal processing, said apparatus comprising:

means for producing an anti-noise signal based on information from a first audio signal;

means for separating a target component of a second audio signal from a noise component of the second audio signal to produce a separated target component; and means for producing an audio output signal based on a result of mixing the anti-noise signal and the separated target component, wherein the second audio signal includes (A) a first channel that is based on a signal produced by a first microphone and (B) a second channel that is based on a signal produced by a second microphone that is arranged to receive a user's voice more directly than the first microphone, wherein said means for separating is configured to perform a spatially selective processing operation on the second audio signal to produce the separated target component.

31. The apparatus according to claim 30, wherein the first audio signal is based on a signal produced by an error feedback microphone, and wherein said producing the anti-noise signal comprises filtering said first audio signal.

32. The apparatus according to claim 30, wherein said first channel of the second audio signal is the first audio signal.

33. The apparatus according to claim 30, wherein said separated target component is a separated voice component, and wherein said means for separating a target component is configured to separate a voice component of the second audio input signal from a noise component of the second audio input signal to produce the separated voice component.

34. The apparatus according to claim 30, wherein the anti-noise signal is based on the separated target component.

35. The apparatus according to claim 30, wherein said apparatus comprises means for attenuating a desired sound component in the first audio signal, relative to a noise component of the first audio signal, to produce a third audio signal, and wherein said means for producing the anti-noise signal is arranged to filter a signal that includes energy from the third audio signal to produce the anti-noise signal.

36. The apparatus according to claim 35, wherein said attenuating the desired sound component in the first audio signal comprises subtracting the separated target component from the first audio signal.

37. The apparatus according to claim 36, wherein the first audio signal is an error feedback signal.

38. The apparatus according to claim 35, wherein said means for separating includes said means for attenuating the desired sound component in the first audio signal, and wherein said means for separating is configured to perform said attenuating the desired sound component in the first audio signal by separating said target component from said noise component to produce a separated noise component, and wherein said first channel of the second audio signal is the first audio signal, and wherein the third audio signal includes the separated noise component produced by said means for separating.

39. The apparatus according to claim 30, wherein said apparatus includes means for mixing the audio output signal with a far-end communications signal.

40. The apparatus according to claim 30, wherein said separated target component is a combination of energy from the first channel and energy from the second channel.

41. The apparatus according to claim 30, wherein said spatially selective processing operation includes calculating, for each of a plurality of different frequency components of the second audio signal, a difference between a phase of the frequency component in the first channel and a phase of the frequency component in the second channel.

42. An apparatus for audio signal processing, said apparatus comprising:

an active noise cancellation filter configured to produce an anti-noise signal based on information from a first audio signal;

a source separation module configured to separate a target component of a second audio signal from a noise component of the second audio signal to produce a separated target component; and an audio output stage configured to produce an audio output signal based on a result of mixing the anti-noise signal and the separated target component, wherein the second audio signal includes (A) a first channel that is based on a signal produced by a first microphone and (B) a second channel that is based on a signal produced by a second microphone that is arranged to receive a user's voice more directly than the first microphone, wherein said source separation module is configured to perform a spatially selective processing operation on the second audio signal to produce the separated target component.

43. The apparatus according to claim 42, wherein the first audio signal is based on a signal produced by an error feedback microphone, and wherein said producing the anti-noise signal comprises filtering said first audio signal.

44. The apparatus according to claim 42, wherein said first channel of the second audio signal is the first audio signal.

45. The apparatus according to claim 42, wherein said separated target component is a separated voice component, and wherein said source separation module is configured to separate a voice component of the second audio input signal from a noise component of the second audio input signal to produce the separated voice component.

46. The apparatus according to claim 45, wherein said voice component of the second audio signal includes the user's voice.

47. The apparatus according to claim 42, wherein the anti-noise signal is based on the separated target component.

48. The apparatus according to claim 42, wherein said apparatus includes means for attenuating a desired sound component in the first audio signal, relative to a noise component of the first audio signal, to produce a third audio signal, and wherein said active noise cancellation filter is arranged to filter a signal that includes energy from the third audio signal to produce the anti-noise signal.

49. The apparatus according to claim 48, wherein said means for attenuating the desired sound component in the first audio signal includes a mixer configured to subtract the separated target component from the first audio signal to produce the third audio signal.

50. The apparatus according to claim 49, wherein the first audio signal is an error feedback signal.

51. The apparatus according to claim 48, wherein said source separation module includes said means for attenuating the desired sound component in the first audio signal to produce the third audio signal, and wherein said source separation module is configured to perform said attenuating the desired sound component in the first audio signal by separating said target component from said noise component to produce a separated noise component, and wherein said first channel of the second audio signal is the first audio signal, and wherein the third audio signal includes the separated noise component produced by said source separation module.

52. The apparatus according to claim 42, wherein said apparatus includes a mixer configured to mix the audio output signal with a far-end communications signal.

53. The apparatus according to claim 42, wherein said separated target component is a combination of energy from the first channel and energy from the second channel.

54. The apparatus according to claim 42, wherein said spatially selective processing operation includes calculating, for each of a plurality of different frequency components of the second audio signal, a difference between a phase of the frequency component in the first channel and a phase of the frequency component in the second channel.

* * * * *